US012647554B2

(12) United States Patent
Lee et al.

(10) Patent No.: US 12,647,554 B2
(45) Date of Patent: Jun. 2, 2026

(54) IMAGE ENCODING/DECODING METHOD AND DEVICE, AND RECORDING MEDIUM STORING BITSTREAM

(71) Applicants: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Gyeonggi-do (KR)

(72) Inventors: Jin Ho Lee, Daejeon (KR); Jung Won Kang, Daejeon (KR); Ha Hyun Lee, Seoul (KR); Sung Chang Lim, Daejeon (KR); Jae Gon Kim, Goyang-si (KR); Ji Hoon Do, Busan (KR); Do Hyeon Park, Goyang-si (KR); Yong Uk Yoon, Jeju Jeju-do (KR)

(73) Assignees: ELECTRONICS and TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 0 days.

(21) Appl. No.: 18/775,718

(22) Filed: Jul. 17, 2024

(65) Prior Publication Data

US 2024/0406376 A1    Dec. 5, 2024

Related U.S. Application Data

(63) Continuation of application No. 17/761,908, filed as application No. PCT/KR2020/012717 on Sep. 21, 2020, now Pat. No. 12,075,028.

(30) Foreign Application Priority Data

Sep. 20, 2019    (KR) ........................ 10-2019-0116394
Sep. 23, 2019    (KR) ........................ 10-2019-0117027
Sep. 23, 2019    (KR) ........................ 10-2019-0117040

(51) Int. Cl.
*H04N 19/00*        (2014.01)
*H04N 19/105*      (2014.01)
            (Continued)

(52) U.S. Cl.
CPC ......... *H04N 19/105* (2014.11); *H04N 19/132* (2014.11); *H04N 19/176* (2014.11); *H04N 19/186* (2014.11)

(58) Field of Classification Search
CPC .. H04N 19/105; H04N 19/132; H04N 19/176; H04N 19/186; H04N 19/136;
            (Continued)

(56) References Cited

U.S. PATENT DOCUMENTS 5,790,839 A * 8/1998 Luk ......................... G11C 5/025
                                                                        713/300
5,901,304 A * 5/1999 Hwang ..................... G11C 7/22
                                                                        365/230.06
            (Continued)

FOREIGN PATENT DOCUMENTS

KR          101387276 B1      4/2014
KR          101555617 B1      9/2015
            (Continued)

*Primary Examiner* — Frank F Huang
(74) *Attorney, Agent, or Firm* — Sughrue Mion, PLLC

(57)            ABSTRACT

An image encoding/decoding method and apparatus are disclosed. The method of decoding an image according to the present invention, comprises, generating a first prediction block of a current block, generating a second prediction block of the current block and generating a final prediction sample of the current block using a sample unit weighted
            (Continued)

sum of the first prediction block and the second prediction block, wherein a weight used for the sample unit weighted sum is determined based on a location of a current luma sample and a geometric prediction mode (GPM) boundary line for partitioning the current block.

18 Claims, 28 Drawing Sheets

(51) Int. Cl.
- *H04N 19/132* (2014.01)
- *H04N 19/176* (2014.01)
- *H04N 19/186* (2014.01)

(58) Field of Classification Search
CPC .... H04N 19/593; H04N 19/119; H04N 19/51; H04N 19/61; H04N 19/577; H04N 19/109; H04N 19/124; H04N 19/70; H04N 19/82; H04N 19/91
See application file for complete search history.

(56) References Cited

U.S. PATENT DOCUMENTS

| | | | | |
|---|---|---|---|---|
| 6,072,834 | A * | 6/2000 | Kim | H04N 19/176 |
| | | | | 382/250 |
| 6,097,756 | A * | 8/2000 | Han | H04N 19/537 |
| | | | | 375/240 |
| 6,580,754 | B1 * | 6/2003 | Wan | H04N 19/33 |
| | | | | 375/E7.079 |
| 6,728,317 | B1 * | 4/2004 | Demos | H04N 19/36 |
| | | | | 348/E7.015 |
| 6,765,962 | B1 * | 7/2004 | Lee | H04N 19/124 |
| | | | | 375/240.03 |
| 6,771,703 | B1 * | 8/2004 | Oguz | H04N 19/59 |
| | | | | 375/240.03 |
| 6,826,232 | B2 * | 11/2004 | Chen | H04N 19/14 |
| | | | | 375/240.18 |
| 7,016,412 | B1 * | 3/2006 | van Zon | H04N 19/156 |
| | | | | 375/240.1 |
| 7,095,782 | B1 * | 8/2006 | Cohen | H04N 21/2404 |
| | | | | 375/E7.02 |
| 7,245,662 | B2 * | 7/2007 | Piche | H04N 19/46 |
| | | | | 382/250 |
| 7,263,124 | B2 * | 8/2007 | Peng | H04N 19/34 |
| | | | | 375/240.03 |
| 7,369,610 | B2 * | 5/2008 | Xu | H04N 21/234327 |
| | | | | 375/E7.091 |
| 7,391,807 | B2 * | 6/2008 | Lin | H04N 19/124 |
| | | | | 375/240.03 |
| 7,477,688 | B1 * | 1/2009 | Zhang | H04N 19/40 |
| | | | | 375/240 |
| 7,627,034 | B2 * | 12/2009 | Park | H04N 19/46 |
| | | | | 375/240.08 |
| 7,697,608 | B2 * | 4/2010 | Lee | H04N 19/14 |
| | | | | 375/240.03 |
| 7,729,421 | B2 * | 6/2010 | Campisano | H04N 19/577 |
| | | | | 375/240.01 |
| 8,040,952 | B2 * | 10/2011 | Park | H04N 21/4347 |
| | | | | 375/240.01 |
| 8,189,659 | B2 * | 5/2012 | Han | H04N 21/43637 |
| | | | | 375/240.02 |
| 8,494,042 | B2 * | 7/2013 | Park | H04N 19/513 |
| | | | | 375/240 |
| 8,681,855 | B2 | 3/2014 | Yin et al. | |
| 10,250,908 | B2 | 4/2019 | Chen et al. | |
| 10,666,940 | B2 | 5/2020 | Park et al. | |
| 10,735,721 | B2 * | 8/2020 | Abe | H04N 19/105 |
| 10,805,631 | B2 * | 10/2020 | Lee | H04N 19/70 |
| 11,095,916 | B2 * | 8/2021 | Seregin | H04N 19/70 |
| 11,190,770 | B2 * | 11/2021 | Lee | H04N 19/50 |
| 11,206,396 | B2 * | 12/2021 | Seregin | H04N 19/159 |
| 11,223,830 | B2 * | 1/2022 | Poirier | H04N 19/52 |
| 11,290,730 | B2 * | 3/2022 | Bordes | H04N 19/139 |
| 11,381,829 | B2 * | 7/2022 | Park | H04N 19/176 |
| 11,405,613 | B2 * | 8/2022 | Lee | H04N 19/119 |
| 11,470,347 | B2 * | 10/2022 | Jeong | H04N 19/82 |
| 11,711,525 | B2 * | 7/2023 | Bordes | H04N 19/105 |
| | | | | 375/240.16 |
| 11,805,255 | B2 * | 10/2023 | Lee | H04N 19/119 |
| 2006/0034374 | A1 * | 2/2006 | Park | G06T 7/20 |
| | | | | 348/E5.066 |
| 2007/0064791 | A1 * | 3/2007 | Okada | H04N 19/63 |
| | | | | 375/E7.125 |
| 2009/0028245 | A1 * | 1/2009 | Vieron | H04N 19/109 |
| | | | | 375/E7.123 |
| 2011/0243231 | A1 * | 10/2011 | Li | H04N 19/433 |
| | | | | 375/E7.256 |
| 2011/0268175 | A1 * | 11/2011 | Tan | H04N 19/895 |
| | | | | 375/E7.026 |
| 2013/0028324 | A1 * | 1/2013 | Chang | H04N 19/433 |
| | | | | 375/E7.125 |
| 2014/0092970 | A1 * | 4/2014 | Misra | H04N 19/52 |
| | | | | 375/240.16 |
| 2016/0112704 | A1 * | 4/2016 | Grange | H04N 19/85 |
| | | | | 375/240.12 |
| 2017/0085917 | A1 * | 3/2017 | Hannuksela | H04N 19/136 |
| 2017/0214937 | A1 * | 7/2017 | Lin | H04N 19/577 |
| 2018/0376126 | A1 * | 12/2018 | Hannuksela | H04N 13/161 |
| 2019/0246133 | A1 * | 8/2019 | Lee | H04N 19/70 |
| 2020/0014947 | A1 * | 1/2020 | Abe | H04N 19/176 |
| 2020/0213617 | A1 * | 7/2020 | Choi | H04N 19/46 |
| 2020/0260070 | A1 * | 8/2020 | Yoo | H04N 19/176 |
| 2022/0030249 | A1 | 1/2022 | Moon et al. | |

FOREIGN PATENT DOCUMENTS

| | | |
|---|---|---|
| KR | 1020170084055 A | 7/2017 |
| KR | 1020180005121 A | 1/2018 |
| KR | 1020180084659 A | 7/2018 |
| WO | 2019039322 A1 | 2/2019 |

* cited by examiner

135-DEGREE DIAGONAL DIRECTION     45-DEGREE DIAGONAL DIRECTION

| 4 | 6 | 7 |   |   |   |   |   | CU1 |
|---|---|---|---|---|---|---|---|---|
| 2 | 4 | 6 | 7 |   |   |   |   |   |
| 1 | 2 | 4 | 6 | 7 |   |   |   |   |
|   | 1 | 2 | 4 | 6 | 7 |   |   |   |
|   |   | 1 | 2 | 4 | 6 | 7 |   |   |
|   |   |   | 1 | 2 | 4 | 6 |   | 7 |
|   |   |   |   | 2 | 4 | 6 |   | 7 |
| CU2 |   |   |   |   | 4 | 6 |   | 7 |

| 4 | 7 | CU1 |
|---|---|---|
| 1 | 4 | 7 |
|   | 1 | 4 | 7 |
| CU2 | 4 | 7 |

FIG. 19

| 8 | 8 | 8 | 8 | 8 | 8 | 6 | 4 | 2 | 0 | 0 | 0 | 0 | 0 | 0 | 0 |
|---|---|---|---|---|---|---|---|---|---|---|---|---|---|---|---|
| 8 | 8 | 8 | 8 | 8 | 8 | 7 | 5 | 2 | 0 | 0 | 0 | 0 | 0 | 0 | 0 |
| 8 | 8 | 8 | 8 | 8 | 8 | 7 | 5 | 3 | 1 | 0 | 0 | 0 | 0 | 0 | 0 |
| 8 | 8 | 8 | 8 | 8 | 8 | 7 | 5 | 3 | 1 | 0 | 0 | 0 | 0 | 0 | 0 |
| 8 | 8 | 8 | 8 | 8 | 8 | 8 | 6 | 4 | 2 | 0 | 0 | 0 | 0 | 0 | 0 |
| 8 | 8 | 8 | 8 | 8 | 8 | 8 | 6 | 4 | 2 | 0 | 0 | 0 | 0 | 0 | 0 |
| 8 | 8 | 8 | 8 | 8 | 8 | 8 | 7 | 5 | 2 | 0 | 0 | 0 | 0 | 0 | 0 |
| 8 | 8 | 8 | 8 | 8 | 8 | 8 | 7 | 5 | 3 | 1 | 0 | 0 | 0 | 0 | 0 |
| 8 | 8 | 8 | 8 | 8 | 8 | 8 | 7 | 5 | 3 | 1 | 0 | 0 | 0 | 0 | 0 |
| 8 | 8 | 8 | 8 | 8 | 8 | 8 | 8 | 6 | 3 | 1 | 0 | 0 | 0 | 0 | 0 |
| 8 | 8 | 8 | 8 | 8 | 8 | 8 | 8 | 6 | 4 | 2 | 0 | 0 | 0 | 0 | 0 |
| 8 | 8 | 8 | 8 | 8 | 8 | 8 | 8 | 6 | 4 | 2 | 0 | 0 | 0 | 0 | 0 |
| 8 | 8 | 8 | 8 | 8 | 8 | 8 | 8 | 7 | 5 | 3 | 1 | 0 | 0 | 0 | 0 |
| 8 | 8 | 8 | 8 | 8 | 8 | 8 | 8 | 7 | 5 | 3 | 1 | 0 | 0 | 0 | 0 |
| 8 | 8 | 8 | 8 | 8 | 8 | 8 | 8 | 8 | 6 | 3 | 1 | 0 | 0 | 0 | 0 |
| 8 | 8 | 8 | 8 | 8 | 8 | 8 | 8 | 8 | 6 | 4 | 2 | 0 | 0 | 0 | 0 |

FIG. 20

| 5 | 3 |
|---|---|
| 2 | 2 |

| 2 |
|---|

FIG. 21
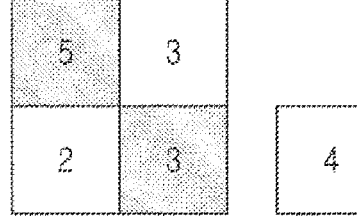
FIG. 22
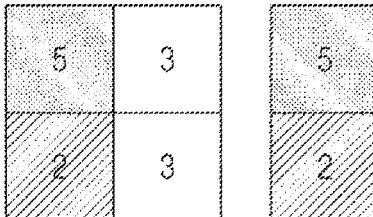
FIG. 23
FIG. 24
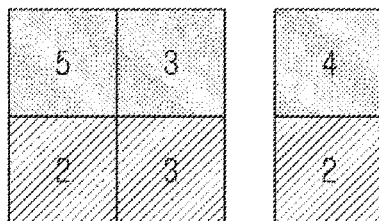

FIG. 25

| Bi | MV1 | MV1 | MV1 |
|----|-----|-----|-----|
| MV0 | Bi | MV1 | MV1 |
| MV0 | MV0 | Bi | MV1 |
| MV0 | MV0 | MV0 | Bi |

FIG. 26

| MV0 | MV1 | MV1 | MV1 |
|-----|-----|-----|-----|
| MV0 | MV0 | MV1 | MV1 |
| MV0 | MV0 | MV0 | MV1 |
| MV0 | MV0 | MV0 | MV0 |

FIG. 27

| MV1 | MV1 | MV1 | MV1 |
|-----|-----|-----|-----|
| MV0 | MV1 | MV1 | MV1 |
| MV0 | MV0 | MV1 | MV1 |
| MV0 | MV0 | MV0 | MV1 |

FIG. 28

| 5 | 3 | 1 | 0 |
|---|---|---|---|
| 6 | 3 | 1 | 0 |
| 6 | 4 | 2 | 0 |
| 6 | 4 | 2 | 0 |

FIG. 29

| 5 | 3 | 1 | 0 |
|---|---|---|---|
| 6 | 3 | 1 | 0 |
| 6 | 4 | 2 | 0 |
| 6 | 4 | 2 | 0 |

FIG. 30

| 5 | 3 | 1 | 0 |
|---|---|---|---|
| 6 | 3 | 1 | 0 |
| 6 | 4 | 2 | 0 |
| 6 | 4 | 2 | 0 |

FIG. 33

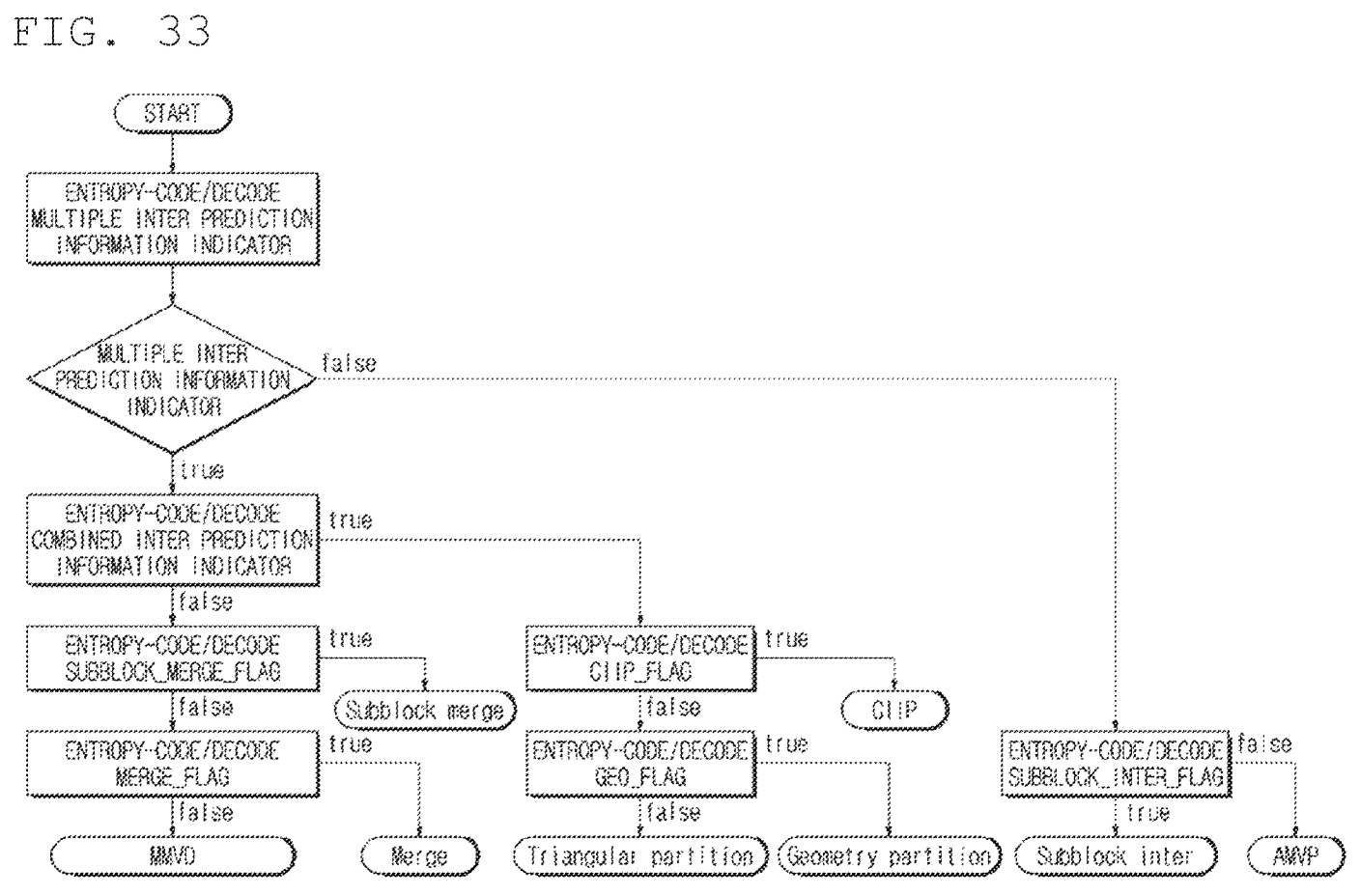

START

ENTROPY-CODE/DECODE
MULTIPLE INTER PREDICTION
INFORMATION INDICATOR

MULTIPLE INTER
PREDICTION INFORMATION
INDICATOR false true

ENTROPY-CODE/DECODE
COMBINED INTER PREDICTION
INFORMATION INDICATOR true false

ENTROPY-CODE/DECODE
SUBBLOCK_MERGE_FLAG true

Subblock merge false

ENTROPY-CODE/DECODE
MERGE_FLAG true

Merge false

MMVD

ENTROPY-CODE/DECODE
CIIP_FLAG true

CIIP false

ENTROPY-CODE/DECODE
GEO_FLAG true

Geometry partition false

Triangular partition

ENTROPY-CODE/DECODE
SUBBLOCK_INTER_FLAG true

Subblock inter false

AMVP

FIG. 35

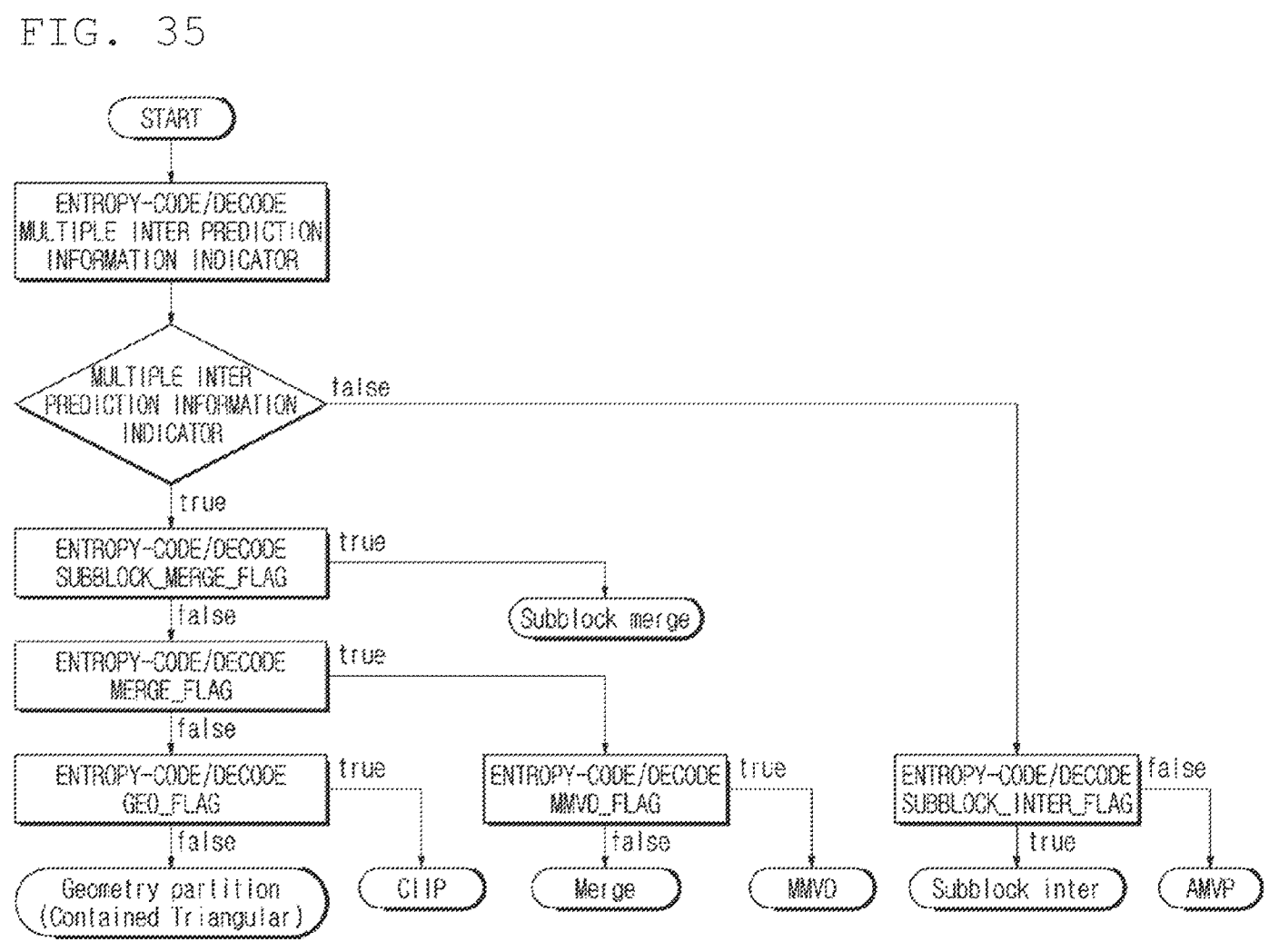

START

ENTROPY-CODE/DECODE MULTIPLE INTER PREDICTION INFORMATION INDICATOR

MULTIPLE INTER PREDICTION INFORMATION INDICATOR false → ENTROPY-CODE/DECODE SUBBLOCK_INTER_FLAG
  false → AMVP
  true → Subblock inter true ENTROPY-CODE/DECODE SUBBLOCK_MERGE_FLAG
  true → Subblock merge
  false ENTROPY-CODE/DECODE MERGE_FLAG
  true → ENTROPY-CODE/DECODE MMVD_FLAG
    true → MMVD
    false → Merge
  false ENTROPY-CODE/DECODE GEO_FLAG
  true → CIIP
  false → Geometry partition (Contained Triangular)

FIG. 36

| gpm_partition_idx | angleIdx | distanceIdx |
|---|---|---|
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 1 |
| 20 | 4 | 2 |
| 21 | 4 | 3 |
| 22 | 4 | 4 |
| 23 | 5 | 0 |
| 24 | 5 | 1 |
| 25 | 5 | 2 |
| 26 | 5 | 3 |
| 27 | 5 | 4 |
| 28 | 6 | 0 |
| 29 | 6 | 1 |

| gpm_partition_idx | angleIdx | distanceIdx |
|---|---|---|
| 30 | 6 | 2 |
| 31 | 6 | 3 |
| 32 | 6 | 4 |
| 33 | 7 | 0 |
| 34 | 7 | 1 |
| 35 | 7 | 2 |
| 36 | 7 | 3 |
| 37 | 7 | 4 |
| 38 | 8 | 1 |
| 39 | 8 | 2 |
| 40 | 8 | 3 |
| 41 | 8 | 4 |
| 42 | 9 | 0 |
| 43 | 9 | 1 |
| 44 | 9 | 2 |
| 45 | 9 | 3 |
| 46 | 9 | 4 |
| 47 | 10 | 0 |
| 48 | 10 | 1 |
| 49 | 10 | 2 |
| 50 | 10 | 3 |
| 51 | 10 | 4 |
| 52 | 11 | 0 |
| 53 | 11 | 1 |
| 54 | 11 | 2 |
| 55 | 11 | 3 |
| 56 | 11 | 4 |
| 57 | 12 | 1 |
| 58 | 12 | 2 |
| 59 | 12 | 3 |

| gpm_partition_idx | angleIdx | distanceIdx |
|---|---|---|
| 60 | 12 | 4 |
| 61 | 13 | 0 |
| 62 | 13 | 1 |
| 63 | 13 | 2 |
| 64 | 13 | 3 |
| 65 | 13 | 4 |
| 66 | 14 | 0 |
| 67 | 14 | 1 |
| 68 | 14 | 2 |
| 69 | 14 | 3 |
| 70 | 14 | 4 |
| 71 | 15 | 0 |
| 72 | 15 | 1 |
| 73 | 15 | 2 |
| 74 | 15 | 3 |
| 75 | 15 | 4 |
| 76 | 16 | 1 |
| 77 | 16 | 2 |
| 78 | 16 | 3 |
| 79 | 16 | 4 |
| 80 | 17 | 1 |
| 81 | 17 | 2 |
| 82 | 17 | 3 |
| 83 | 17 | 4 |
| 84 | 18 | 1 |
| 85 | 18 | 2 |
| 86 | 18 | 3 |
| 87 | 18 | 4 |
| 88 | 19 | 1 |
| 89 | 19 | 2 |

| gpm_partition_idx | angleIdx | distanceIdx |
|---|---|---|
| 90 | 19 | 3 |
| 91 | 19 | 4 |
| 92 | 20 | 1 |
| 93 | 20 | 2 |
| 94 | 20 | 3 |
| 95 | 20 | 4 |
| 96 | 21 | 1 |
| 97 | 21 | 2 |
| 98 | 21 | 3 |
| 99 | 21 | 4 |
| 100 | 22 | 1 |
| 101 | 22 | 2 |
| 102 | 22 | 3 |
| 103 | 22 | 4 |
| 104 | 23 | 1 |
| 105 | 23 | 2 |
| 106 | 23 | 3 |
| 107 | 23 | 4 |
| 108 | 24 | 1 |
| 109 | 24 | 2 |
| 110 | 24 | 3 |
| 111 | 24 | 4 |
| 112 | 25 | 1 |
| 113 | 25 | 2 |
| 114 | 25 | 3 |
| 115 | 25 | 4 |
| 116 | 26 | 1 |
| 117 | 26 | 2 |
| 118 | 26 | 3 |
| 119 | 26 | 4 |

| gpm_partition_idx | angleIdx | distanceIdx |
|---|---|---|
| 120 | 27 | 1 |
| 121 | 27 | 2 |
| 122 | 27 | 3 |
| 123 | 27 | 4 |
| 124 | 28 | 1 |
| 125 | 28 | 2 |
| 126 | 28 | 3 |
| 127 | 28 | 4 |
| 128 | 29 | 1 |
| 129 | 29 | 2 |
| 130 | 29 | 3 |
| 131 | 29 | 4 |
| 132 | 30 | 1 |
| 133 | 30 | 2 |
| 134 | 30 | 3 |
| 135 | 30 | 4 |
| 136 | 31 | 1 |
| 137 | 31 | 2 |
| 138 | 31 | 3 |
| 139 | 31 | 4 |

FIG. 37

| Angle_idx | bin |
|-----------|-------|
| 0 | 00000 |
| 1 | 00001 |
| 2 | 00010 |
| 3 | 00011 |
| 4 | 00100 |
| 5 | 00101 |
| 6 | 00110 |
| 7 | 00111 |
| 8 | 01000 |
| 9 | 01001 |
| 10 | 01010 |
| 11 | 01011 |
| 12 | 01100 |
| 13 | 01101 |
| 14 | 01110 |
| 15 | 01111 |

| Angle_idx | bin |
|-----------|-------|
| 16 | 10000 |
| 17 | 10001 |
| 18 | 10010 |
| 19 | 10011 |
| 20 | 10100 |
| 21 | 10101 |
| 22 | 10110 |
| 23 | 10111 |
| 24 | 11000 |
| 25 | 11001 |
| 26 | 11010 |
| 27 | 11011 |
| 28 | 11100 |
| 29 | 11101 |
| 30 | 11110 |
| 31 | 11111 |

| distance_idx | bin |
|--------------|------|
| 0 | 1 |
| 1 | 10 |
| 2 | 100 |
| 3 | 1000 |
| 4 | 1001 |

| C0 | C1 | C2 | C3 | C4 |
|----|----|----|----|----|
| C5 | C6 | C7 | C8 | C9 |
| C10 | C11 | C12 | C13 | C14 |
| C15 | C16 | C17 | C18 | C19 |
| C20 | C21 | C22 | C23 | C24 |

| C0 | C1 | C2 | E(0,-1) | C4 |
|---|---|---|---|---|
| C5 | C6 | E(-1,0) | E(0,0) | E(1,0) |
| C10 | C11 | C12 | E(0,1) | C14 |
| C15 | C16 | C17 | C18 | C19 |
| C20 | C21 | C22 | C23 | C24 |

IMAGE ENCODING/DECODING METHOD AND DEVICE, AND RECORDING MEDIUM STORING BITSTREAM

CROSS REFERENCE TO RELATED APPLICATIONS

This application is a Continuation of U.S. application Ser. No. 17/761,908 filed Mar. 18, 2022, which is a National Stage of International Application No. PCT/KR2020/012717, filed Sep. 21, 2020, claiming priority to Korean Patent Application No. 10-2019-0116394, filed Sep. 20, 2019, Korean Patent Application No. 10-2019-0117027 filed Sep. 23, 2019 and Korean Patent Application No. 10-2019-0117040 filed Sep. 23, 2019. The disclosures of which are incorporated herein by reference in their entireties.

TECHNICAL FIELD

The present invention relates to a method and apparatus for encoding/decoding an image and apparatus, and a recording medium for storing a bitstream.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved compression efficiency.

Another object of the present invention is to provide an image encoding/decoding method and apparatus by bi-directional inter prediction.

Another object of the present invention is to provide an image encoding/decoding method and apparatus by using geometric inter prediction.

Another object of the present invention is to provide a recording medium for storing a bitstream generated by an image encoding/decoding method or apparatus according to the present invention.

Technical Solution

The method of decoding an image according to the present disclosure, method comprises, generating a first prediction block of a current block, generating a second prediction block of the current block and generating a final prediction sample of the current block using a sample unit weighted sum of the first prediction block and the second prediction block, wherein a weight used for the sample unit weighted sum is determined based on a location of a current luma sample and a geometric prediction mode (GPM) boundary line for partitioning the current block.

Wherein the method of decoding an image further comprises, acquiring a GPM partitioning index of the current block and specifying the GPM boundary line based on the GPM partitioning index.

wherein the GPM partitioning index indicates at least one of a distance from a center of the current block to the GPM boundary line or an angle of the GPM boundary line.

wherein the GPM boundary line is specified based on at least one of the distance from the center of the current block to the GPM boundary line or the angle of the GPM boundary line.

wherein a weight applied to the current luma sample is determined based on a distance between a current sample and the GPM boundary line.

wherein a weight applied to a current chroma sample is determined using a weight of a luma sample corresponding to the current chroma sample.

wherein a weight applied to the current luma sample is determined to be one of {7/8, 6/8, 4/8, 2/8, 1/8}.

The method of decoding an image further comprises, deriving a merge candidate list of the current block and deriving a GPM candidate list of the current block using the merge candidate list.

The image decoding method of claim 8, wherein at least one of GPM candidate 0, 2 or 4 of the GPM candidate list is derived using L0 motion information of a merge candidate corresponding to the GPM candidate.

wherein at least one of GPM candidate 1, 3 or 5 of the GPM candidate list is derived using L1 motion information of a merge candidate corresponding to the GPM candidate.

The method of decoding an image further comprises, acquiring a first GPM index and a second GPM index, acquiring first motion information based on the first GPM index and the GPM candidate list and acquiring second motion information based on the second GPM index and the GPM candidate list, wherein the first prediction block is generated based on the first motion information and the second prediction block is generated based on the second motion information.

The method of decoding an image according to the present disclosure, method comprises, generating a first prediction block of a current block, generating a second prediction block of the current block, generating a final prediction sample of the current block using a sample unit weighted sum of the first prediction block and the second prediction block and encoding weight related information used for the sample unit weighted sum, wherein the weight related information is determined based on a location of a current luma sample and a geometric prediction mode (GPM) boundary line for partitioning the current block.

wherein the weight related information indicates at least one of a distance from a center of the current block to the GPM boundary line or an angle of the GPM boundary line.

A computer-readable recording medium for storing a bitstream received by an image decoding apparatus and used to reconstruct a current block included in a current picture, the bitstream being generated by an image encoding method according to the present disclosure, the image encoding method comprising, generating a first prediction block of a current block, generating a second prediction block of the current block, generating a final prediction sample of the current block using a sample unit weighted sum of the first prediction block and the second prediction block and encoding weight related information used for the sample unit weighted sum, wherein the weight related information is determined based on a location of a current luma sample and a geometric prediction mode (GPM) boundary line for partitioning the current block.

Advantageous Effects

According to the present invention, it is possible to provide an image encoding/decoding method and apparatus, a recording medium storing a bitstream generated by the image encoding method/apparatus, with improved compression efficiency.

In addition, according to the present invention, it is possible to provide an image encoding/decoding method and apparatus, a recording medium storing a bitstream generated by the image encoding method/apparatus by bi-directional inter prediction.

In addition, according to the present invention, it is possible to provide an image encoding/decoding method and apparatus, a recording medium storing a bitstream generated by the image encoding method/apparatus by geometric inter prediction.

DESCRIPTION OF DRAWINGS

FIG. 19 is a view illustrating a weight applicable to a GPM according to another embodiment of the present disclosure.

FIGS. 20 to 24 are views illustrating a weight applicable to a chroma block, to which a GPM according to several embodiments of the present disclosure is applied.

FIGS. 25 to 27 are views illustrating a method of encoding/decoding motion information of a block, to which a GPM according to several embodiments of the present disclosure is applied.

FIGS. 28 to 30 are other views illustrating a method of encoding/decoding motion information of a block, to which a GPM according to several embodiments of the present disclosure is applied.

FIGS. 31 to 35 are views illustrating a method of encoding/decoding intra prediction mode information according to several embodiments of the present disclosure.

FIGS. 36 and 37 are views illustrating a method of entropy-encoding/decoding GPM information.

MODE FOR INVENTION

Figure 1:
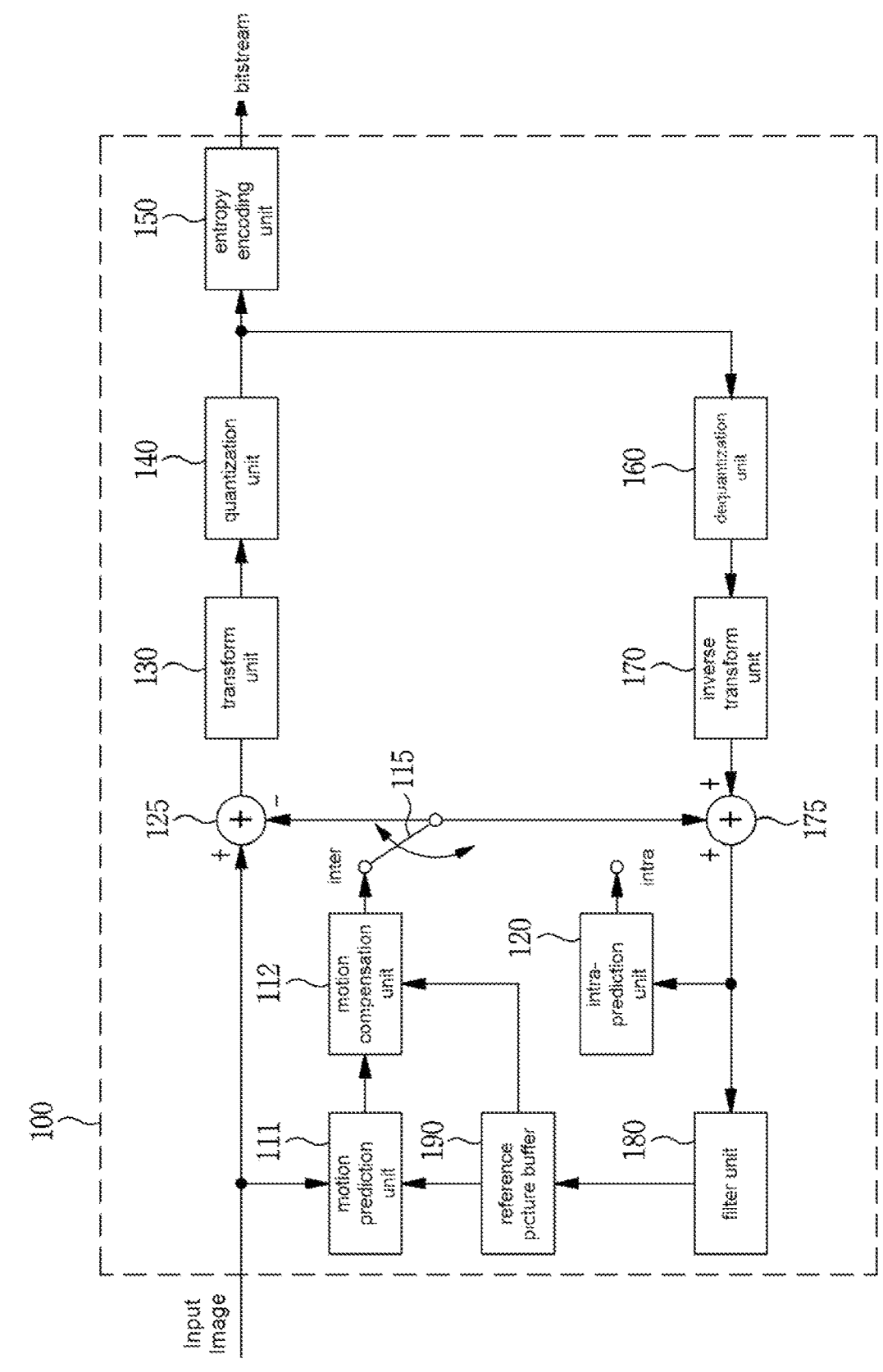
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
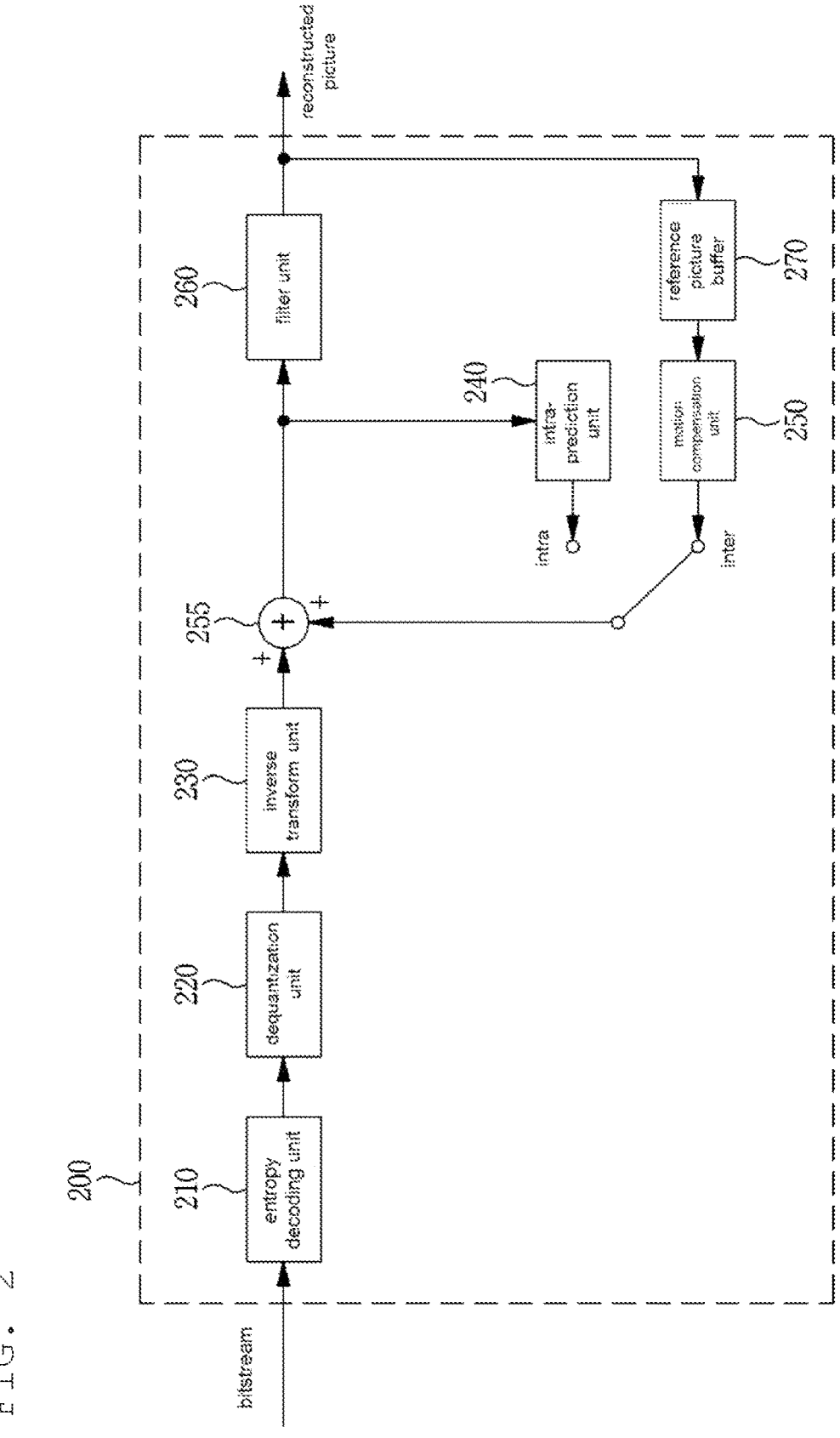
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
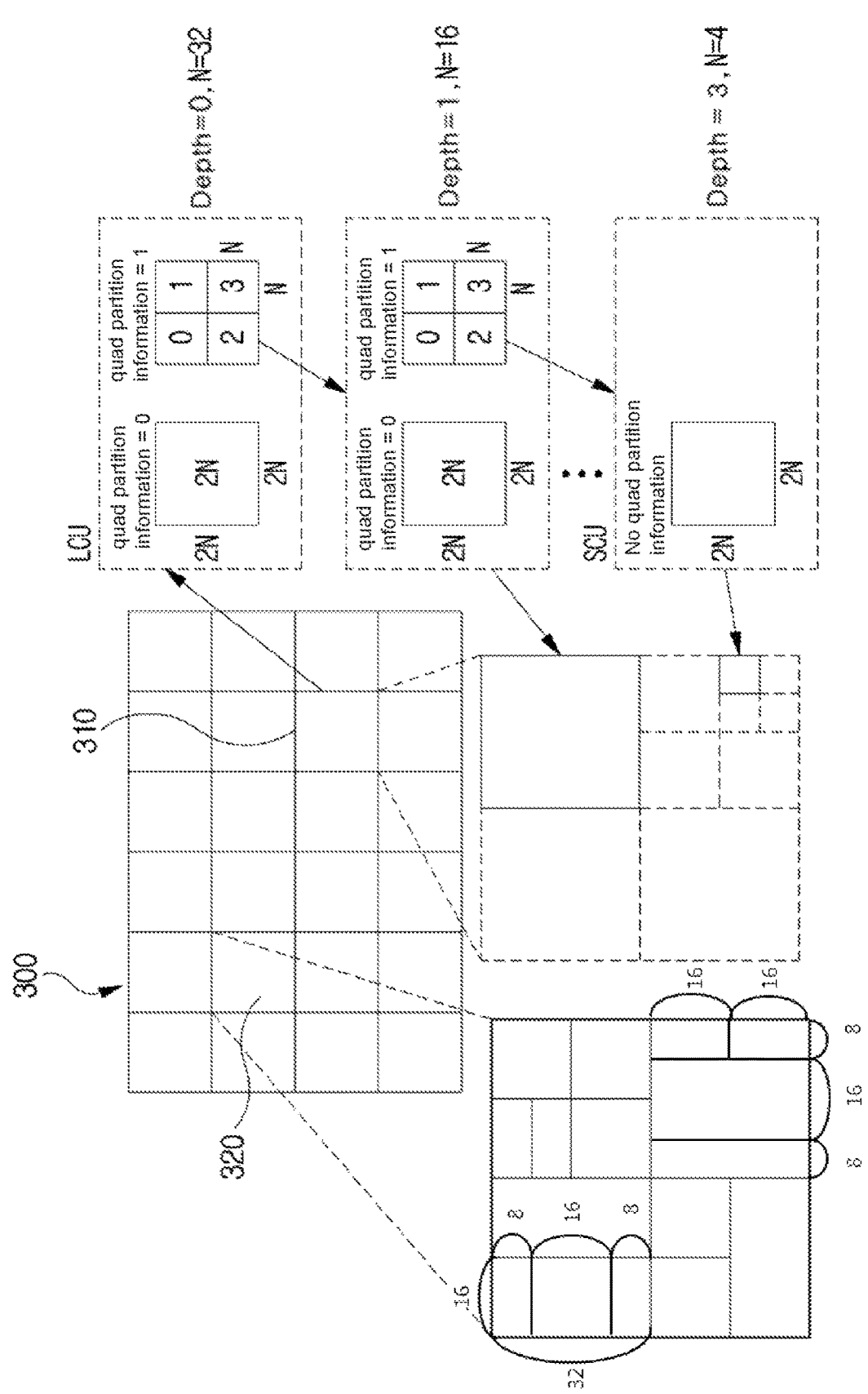
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units cor-responding to the respective nodes of a binary tree (herein-after, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units correspond-ing to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication infor-mation may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be sig-naled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree parti-tioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
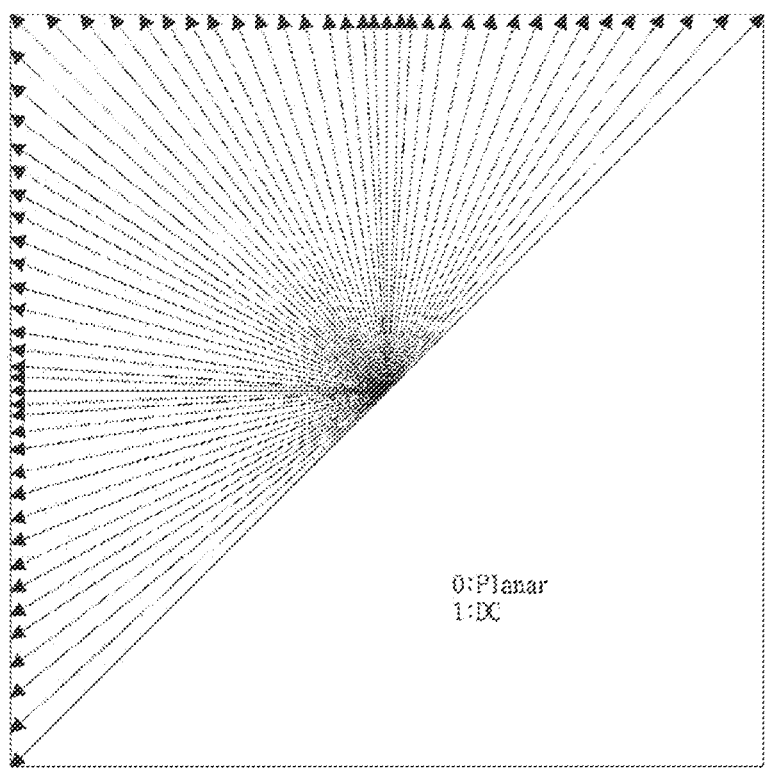
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
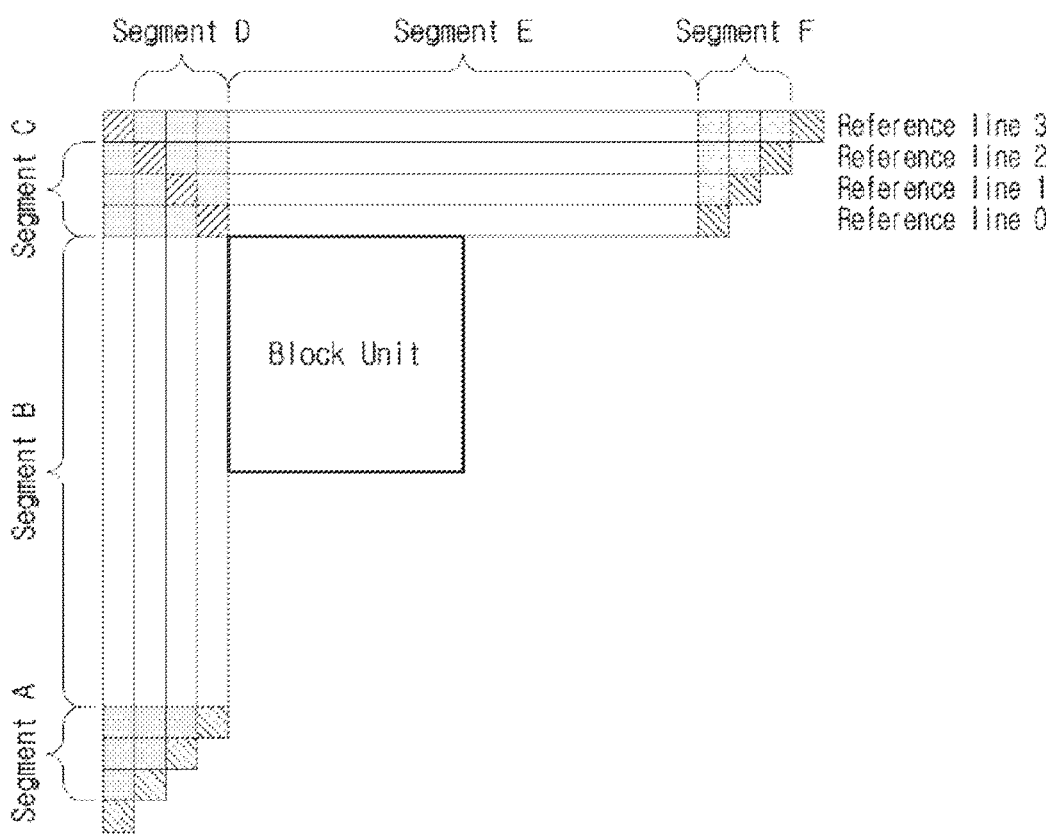
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
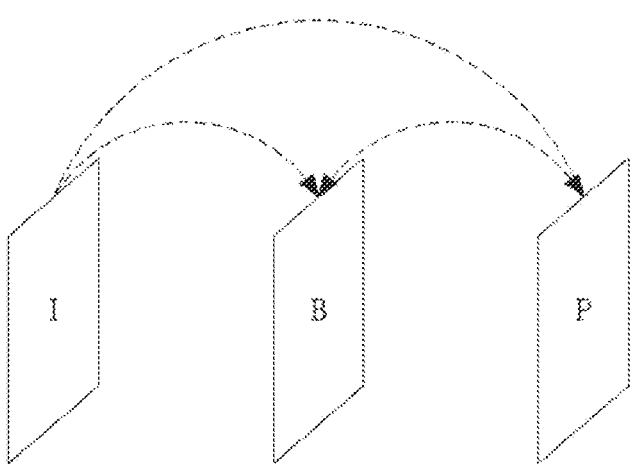
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
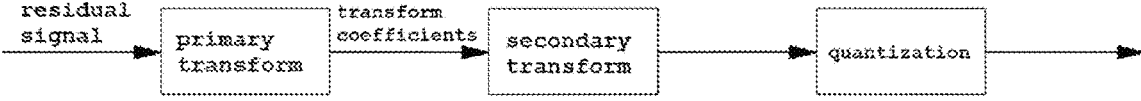
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, a geometric inter prediction encoding/decoding method according to several embodiments of the present disclosure will be described in detail.

In the following description, a geometric inter prediction mode, Geometry Partition (GEO) and Geometric Partition Mode (GPM) may all be used as the same meaning.

Figure 8:
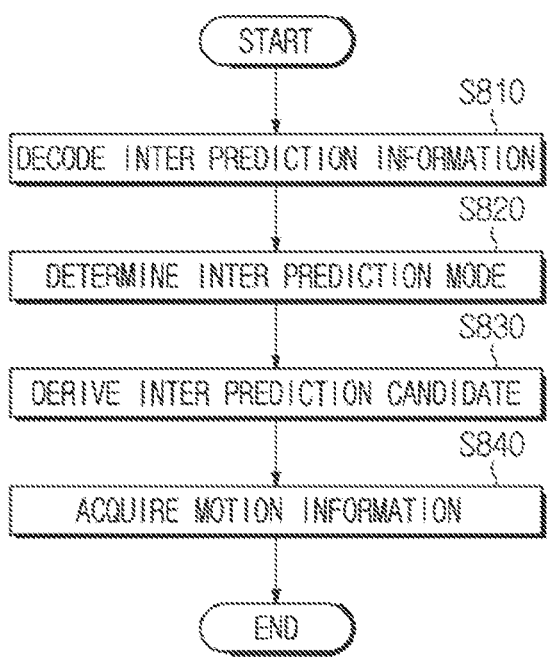
FIG. 8 is a view illustrating an image decoding method according to an embodiment of the present disclosure.

FIG. 8 is a view illustrating an image decoding method according to an embodiment of the present disclosure.

Referring to FIG. 8, the image decoding method according to an embodiment of the present disclosure may include decoding inter prediction information of a current block (S810), determining an inter prediction mode of the current block (S820), deriving an inter prediction candidate of the current block (S830) and/or determining/acquiring motion information of the current block (S840).

Figure 9:
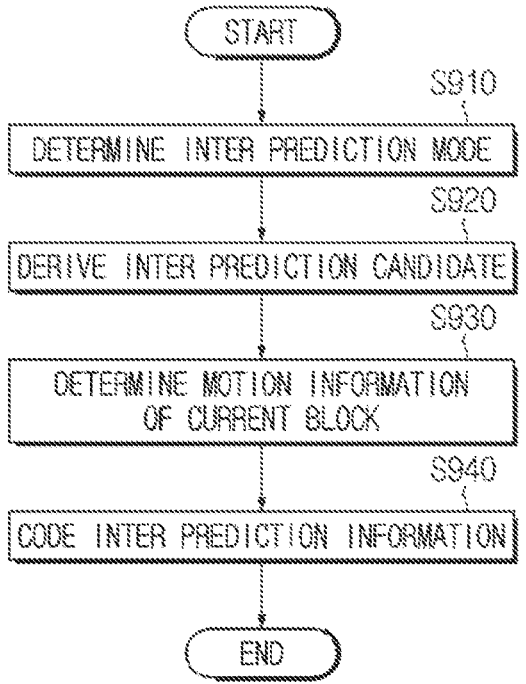
FIG. 9 is a view illustrating an image encoding method according to an embodiment of the present disclosure.

FIG. 9 is a view illustrating an image encoding method according to an embodiment of the present disclosure.

Referring to FIG. 9, the image encoding method according to the embodiment of the present disclosure may include determining an inter prediction mode of a current block (S910), deriving an inter prediction candidate of the current block (S920), determining/acquiring motion information of the current block (S930) and/or encoding inter prediction information of the current block (S940).

Figure 10:
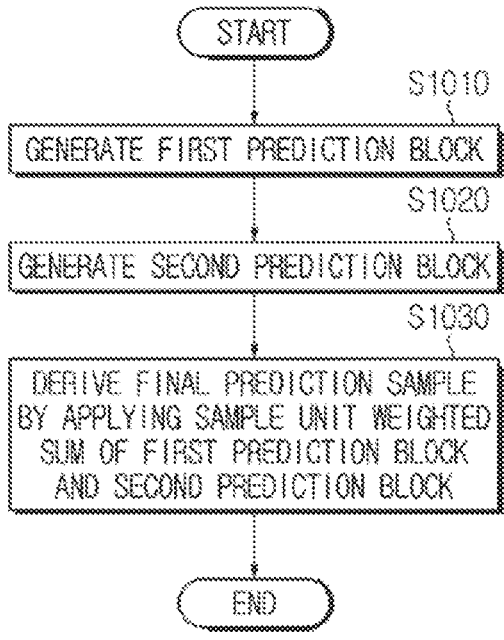
FIG. 10 is a view illustrating an image decoding method according to another embodiment of the present disclosure.

FIG. 10 is a view illustrating an image decoding method according to another embodiment of the present disclosure.

Referring to FIG. 10, the image decoding method according to another embodiment of the present disclosure may include generating a first prediction block of a current block (S1010), generating a second prediction block of the current block (S1020) and/or generating a final prediction sample of the current block using a sample unit weighted sum of the first prediction block and the second prediction block (S1030).

At this time, a weight used for a sample unit weighted sum may be determined based on a location of a current luma sample and a GPM boundary line for partitioning the current block.

Figure 11:
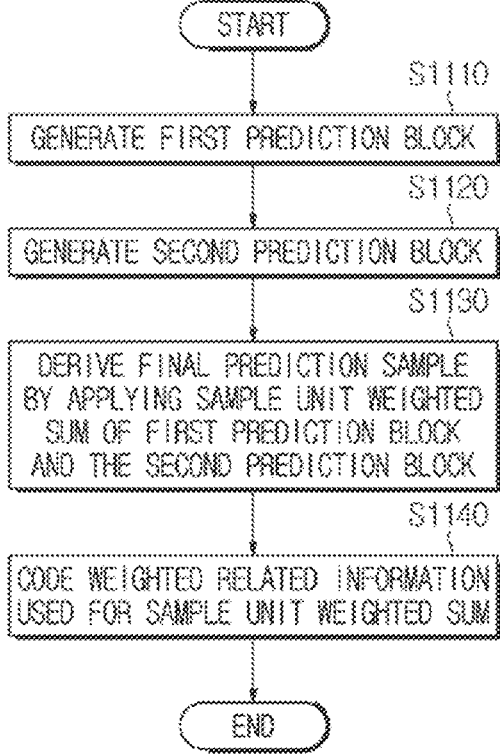
FIG. 11 is a view illustrating an image encoding method according to another embodiment of the present disclosure.

FIG. 11 is a view illustrating an image encoding method according to another embodiment of the present disclosure.

Referring to FIG. 11, the image encoding method according to another embodiment of the present disclosure may include generating a first prediction block of a current block (S1110), generating a second prediction block of the current block (S1120), generating a final prediction sample of the current block using a sample unit weighted sum of the first prediction block and the second prediction block (S1130) and/or encoding weight related information used for the sample unit weighted sum (S1140).

At this time, the weight related information may be determined based on a location of a current luma sample and a GPM boundary line for partitioning the current block.

Hereinafter, steps of FIGS. 8 and 9 will be described in detail.

First, steps S820 and S910 of determining the inter prediction mode of the current block will be described in detail.

According to several embodiments of the present disclosure, the prediction mode of the current block may be determined as at least one of a skip mode, a merge mode or an AMVP mode.

For example, the inter prediction mode of the current block may be determined as a merge mode. In this case, the prediction block of the current block may be derived using motion information of a neighboring block. For example, inter prediction of the current block may be performed using the motion information of the neighboring block, and residual blocks thereof may be derived. At this time, the neighboring block used for prediction may be determined as a neighboring block in which minimum cost is consumed for encoding/decoding prediction information and a residual block.

As another example, the inter prediction mode of the current block may be determined as a skip mode. In this case, the prediction block of the current block may be derived using the motion information of the neighboring block. If the skip mode is applied, residual blocks may not be generated.

As another example, the inter prediction mode of the current block may be determined as an AMVP mode. In this case, the prediction block of the current block may be derived using the motion information of the neighboring block. If the AMVP mode is applied, prediction motion information of the current block may be derived through the neighboring block, and the prediction block of the current block may be derived through additional search/operation based on the prediction motion information.

In addition, the prediction mode of the current block may be determined as at least one prediction mode of a sub-block based merge mode, a sub-block based skip mode, a sub-block based AMVP mode, an MMVD, a CIIP mode and a triangular partitioning mode or a combination of at least one of the merge mode, the skip mode or the AMVP mode and at least one prediction mode of the above-described prediction modes. At this time, the prediction mode of the current block may be determined using information such as a signaled flag, index, etc. As another example, the prediction mode of the current block may be determined without signaling based on an encoding parameter.

If the prediction mode of the current block is determined as a sub-block based prediction mode, the current block may be partitioned into M sub-blocks, thereby determining M pieces of inter prediction information. At this time, the size of the sub-block may be at least one of 4×4, 4×8, 8×4, 4×16, 16×4 . . . 2N×N or N×2N, and may be pre-set to a predetermined size.

For example, the inter prediction mode of the current block may be determined as a sub-block based merge mode. The sub-block based merge mode of the current block may be performed using at least one of an ATMVP mode or an affine mode. That is, the inter prediction mode of the current block is an ATMVP or affine mode, the sub-block based merge mode is applicable.

If the sub-block based merge mode is applied to the current block, prediction information may be configured by a merge index and a residual signal and signaled. At this time, sub-block unit motion information of a neighboring bock in which minimum cost is consumed may be used to encode/decode the current block.

As another example, the inter prediction mode of the current block may be determined as a sub-block based skip mode. If the sub-block based skip mode is applied to the current block, prediction information may be configured by a merge index and a residual signal and signaled. At this time, the sub-block unit motion information of the neighboring block in which minimum cost is consumed may be used for encoding/decoding of the current block. If the sub-block based skip mode is applied, the sub-block unit motion information of the neighboring block may be used as the sub-block unit motion information of the current block, but a residual block according to prediction may not be derived.

As another example, the inter prediction mode of the current block may be determined as a sub-block based AMVP mode. The sub-block based AMVP mode is applicable when the prediction mode of the current block is an affine mode. If the sub-block unit AMVP mode of the current block is applied, prediction information may be configured based on at least one of an AMVP index, a motion vector difference, a reference picture index, a reference direction or a residual signal and signaled. At this time, the sub-block unit motion information of the neighboring block in which minimum cost is consumed may be used for encoding/decoding of the current block.

As another example, the prediction mode of the current block may be determined as an MMVD mode. The MMVD mode is applicable when at least one of a merge mode, a skip mode, a sub-block based merge mode or a sub-block based skip mode is applied to the current block. If the MMVD mode is applied to the current block, at least one of a motion vector correction value or a motion vector correction direction may be signaled as MMVD prediction information. That is, encoding/decoding of the current block may be performed through signaling of the motion information of the neighboring block and MMVD prediction information.

Next, steps S830 and S920 of deriving the inter prediction candidate of the current block will be described in detail.

The inter prediction candidate may be derived using at least one of inter prediction information of a spatial neighboring block, inter prediction information of a temporal neighboring block, history based motion vector predictor (HMVP), composite inter prediction information, combined affine inter prediction information, inherited affine inter prediction information, ATMVP or STMVP. At this time, the inter prediction candidate may include information on at least one of a motion vector, a reference direction, a reference picture index, a residual signal or a CPMV. One or more inter prediction candidate lists may be derived.

At this time, the CPMV may be a motion vector used to encode/decode the current block in the affine mode. For example, the CPMV may be motion information of the top left, top right or bottom left location of the block encoded in the affine mode.

The ATMVP may mean sub-block unit motion information determined using motion information derived from a spatial neighboring block determined based on a predetermined order. The ATMVP may be referred to as a Subblock-based TMVP (SbTMVP).

If the affine mode is applied, the CPMV of the current block may be derived using motion vectors CPMV of a sub-block included in the neighboring block. The sub-block unit motion information of the current block may be derived using the derived CPMV.

The STMVP may be motion information derived through a combination of inter prediction information of the spatial neighboring block of the sub-block unit and the temporal neighboring block of the sub-block unit.

Figure 12:
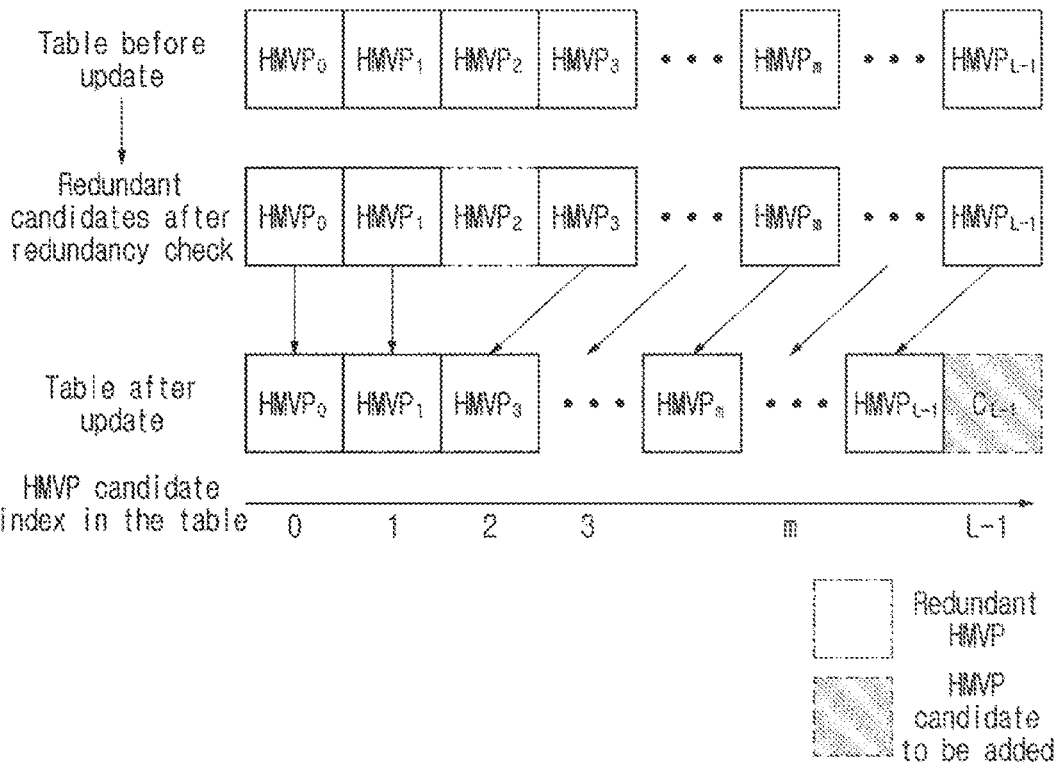
FIG. 12 is a view illustrating a method of a history-based motion vector predictor (HMVP) candidate list.

FIG. 12 is a view illustrating a method of a history-based motion vector predictor (HMVP) candidate list.

The HMVP may mean motion information determined as motion information of blocks encoded/decoded before the current block. An inter prediction candidate derived using the HMVP may be defined as an HMVP candidate.

As shown in FIG. 12, a candidate list may be derived using motion information of pre-encoded/decoded blocks. For example, an HMVP candidate list may be derived using motion information of pre-encoded/decoded blocks. If an inter prediction candidate list of a current block is derived, one or more pieces of motion information (or candidates) of the HMVP candidate list may be used.

For example, a merge candidate list may be derived using motion information of at least one HMVP candidate of an HMVP candidate list. As another example, an AMVP candidate list may be derived using motion information of at least one HMVP candidate of an HMVP candidate list. If motion information of a current block or a prediction block is finally encoded/decoded, the motion information of the block may be added to the HMVP candidate list.

Figure 13:
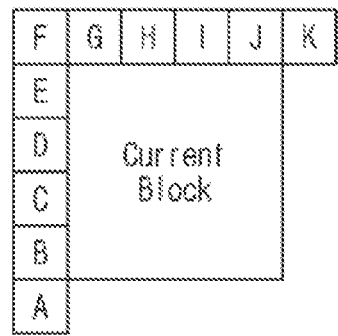
FIG. 13 is a view illustrating a spatial neighboring block which may be used in several embodiments of the present disclosure.
Figure 14:
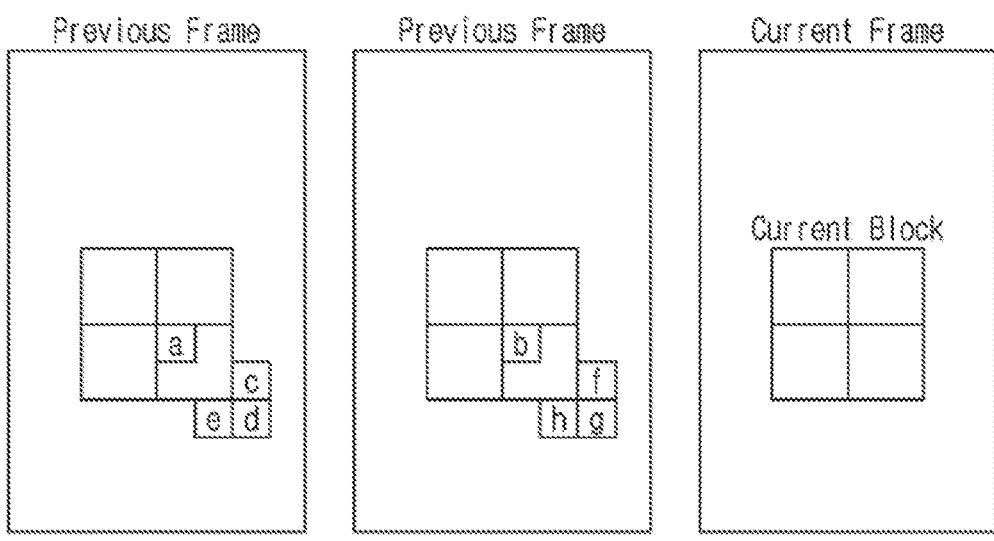
FIG. 14 is a view illustrating a temporal neighboring block which may be used in several embodiments of the present disclosure.

FIG. 13 is a view illustrating a spatial neighboring block which may be used in several embodiments of the present disclosure, and FIG. 14 is a view illustrating a temporal neighboring block which may be used in several embodiments of the present disclosure.

If the inter prediction mode of the current block is determined as a merge mode, a merge candidate list may be derived.

For example, the merge candidate list may be composed of N pieces of inter prediction information. The merge candidate list may be derived using at least one of inter prediction information of a spatial neighboring block, inter prediction information of a temporal neighboring block, a composite inter prediction information, STMVP, ATMVP, HMVP or zero motion information. At this time, N may be a positive integer such as 6.

The inter prediction information of the spatial neighboring block may mean the inter prediction information of blocks located at A, B, . . . , J and K of FIG. 13. At this time, the size of the neighboring block may be M×N. Meanwhile, M or N may be at least one of 2, 4, 8, 16, 32, 64 or 128.

For example, if the spatial motion information of the neighboring block is derived, motion information may be derived in order of J, B, K, A and F. Motion information derived through the spatial neighboring block may be defined as a spatial merge candidate.

The inter prediction information of the temporal neighboring block may mean inter prediction information located in a block of a pre-encoded/decoded picture corresponding to blocks of locations a, b, c, d, e, f, g, h and e of FIG. 14. Motion information derived through the temporal neighboring block may be defined as a temporal merge candidate.

The composite inter prediction information may mean motion information derived by combining at least one of motion information of merge candidates present in the merge candidate list. For example, the motion vector of the composite inter prediction information may be derived by a combination of the motion vectors of N motion candidates present in the merge candidate list. For example, N may be 2. The motion vector of the combined inter prediction information may be derived using an average of the motion vectors of N motion candidates present in the merge candidate list.

HMVP candidates may be sequentially added to the merge candidate list. If the motion information of the already added merge candidates and the motion information of the HMVP to be added are the same, the motion information may not be added to the merge candidate list.

If the number of candidates included in the merge candidate list does not satisfy a maximum number of candidates in the merge candidate list, zero merge candidates composed of zero motion information (zero motion vectors) may be added to the merge candidate list until the number of candidates included in the merge candidate list becomes the maximum number of candidates of the merge candidate list.

If the inter prediction mode of the current block is determined as an AMVP mode, an AMVP candidate list may be derived.

For example, the AMVP candidate list may be composed of N pieces of inter prediction information. The AMVP candidate may be composed of motion information including a motion vector, a reference direction and a motion vector difference. The AMVP candidate list may be derived using at least one of the inter prediction information of the spatial neighboring block, the inter prediction information of the temporal neighboring block, HMVP or zero motion information. For example, N may be 2.

The inter prediction information of the spatial neighboring block may mean inter prediction information of blocks present at locations A, B, . . . , J and K of FIG. 13. One or more candidates may be derived from the spatial neighboring blocks in a predetermined order. Motion information derived using the spatial neighboring block may be defined as a spatial AMVP candidate.

For example, a left neighboring block may be one of blocks A, B, C, D and E, and the spatial AMVP candidate may be derived in a predetermined order. For example, if the spatial AMVP candidate is derived from the left neighboring block, the spatial AMVP candidate may be derived in order of blocks A and B.

Meanwhile, a top neighboring block may be one of blocks F, G, H, I, J and K, and the spatial AMVP candidate may be derived in a predetermined order. For example, if the spatial AMVP candidate is derived from the top neighboring block, the spatial AMVP candidate may be derived in order of blocks K, J and F.

In the case where the spatial AMVP candidate is derived based on the predetermined order, if the motion information of the neighboring blocks corresponding to a current order is unavailable, the motion information of blocks corresponding to a next order may be sequentially derived.

The inter prediction information of the temporal neighboring block may mean inter prediction information present in the temporal neighboring block included in a pre-encoded/decoded picture. At this time, the temporal neighboring block may mean a block at a location corresponding to the location of the current block. For example, the location of the temporal neighboring block may correspond to at least one of a bottom right, a center and a predetermined location. Motion information derived through the temporal neighboring block may be defined as a temporal AMVP candidate.

For example, the temporal neighboring block may correspond to at least one of a block a or b of a pre-encoded/decoded picture. As another example, the temporal neighboring block may be determined as at least one of blocks c, d and e of a pre-encoded/decoded picture and blocks f, g and h of another pre-encoded/decoded picture.

HMVP candidates may be sequentially added to an AMVP candidate list. If the motion information of already added AMVP candidates and the motion information of the HMVP to be added are the same, the motion information may not be added to the AMVP candidate list.

If the number of candidates included in the AMVP candidate list does not satisfy a maximum number of candidates in the AMVP candidate list, zero AMVP candidates composed of zero motion information (zero motion vectors) may be added to the AMVP candidate list until the number of candidates included in the AMVP candidate list becomes the maximum number of candidates of the AMVP candidate list.

If the inter prediction mode of the current block is determined as a sub-block based merge mode, the merge candidate list may be derived in sub-block units. For example, the merge candidate list of the sub-block unit may be composed of N pieces of inter prediction information.

The sub-block unit merge candidate list may be configured using at least one of an ATMVP, inherited affine inter prediction information, combined affine inter prediction information, or zero affine motion prediction information.

Figure 15:
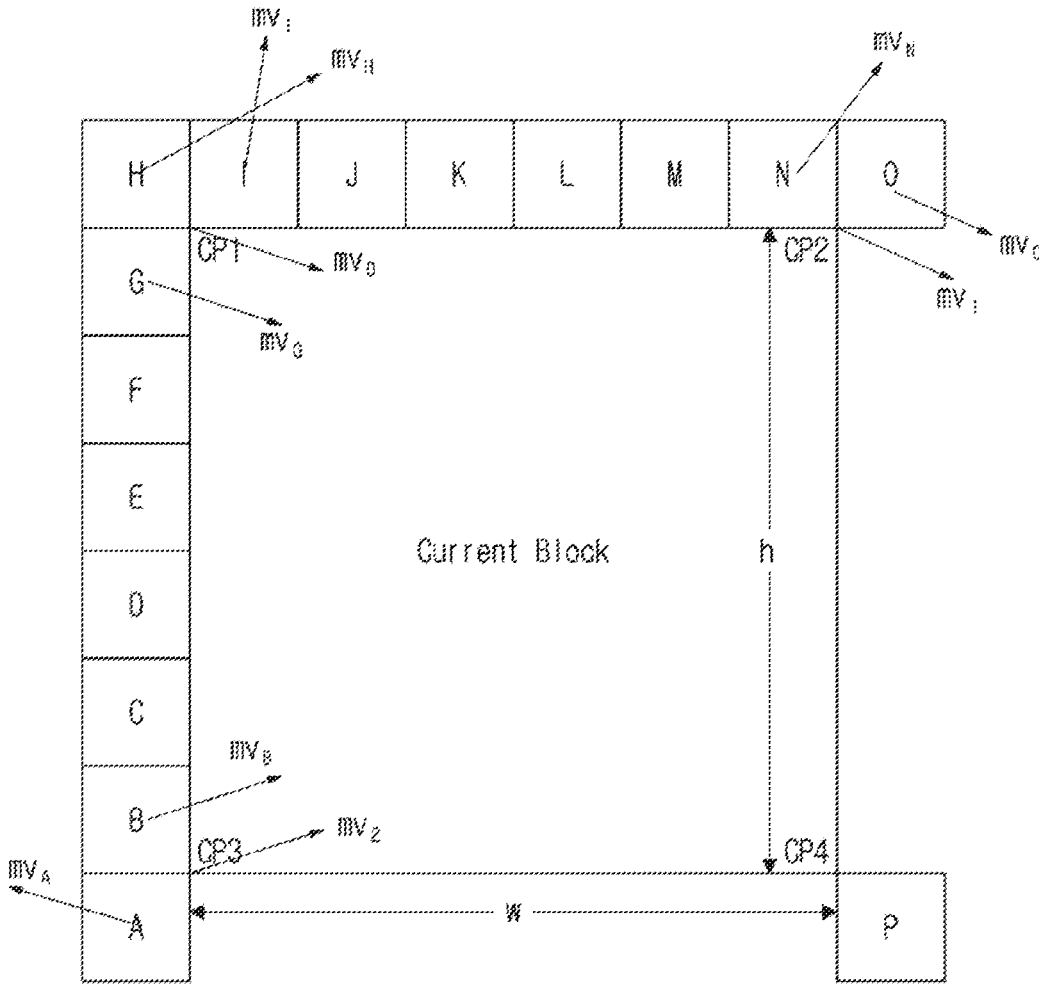
FIG. 15 is a view illustrating a control point motion vector (CPMV).

FIG. 15 is a view illustrating a control point motion vector (CPMV).

Inherited affine inter prediction information may be a CPMV derived from the CPMV of the spatial neighboring block encoded/decoded in the affine mode. The CPMV of the spatial neighboring block may be a sub-block unit motion vector at a top left, top right and/or bottom left location of blocks encoded/decoded in the affine mode. In addition, the CPMV of the current block may be derived by applying scaling based on the widths and heights of a current block and a neighboring block to the CPMV of a neighboring block. The CPMV may be derived from the spatial neighboring block at locations A, B, . . . , H and O of FIG. 15, and one or more inherited affine candidates composed of at least two CPMV combinations may be derived in a predetermined order.

For example, two CPMV combinations may be sub-block unit motion vector combinations derived at the top left and top right locations of the current block. An affine mode in which two CPMVs are derived may be defined as a 4-parameter mode.

As another example, three CPMV combinations may be sub-block unit motion vector combinations derived at the top left, top right and bottom left locations of the current block. An affine mode in which three CPMVs are derived may be defined as a 6-parameter mode.

The combined affine inter prediction information may be derived through a combination of motion vectors of neighboring blocks adjacent to top left (CP1), top right (CP2), bottom left (CP3) and bottom right (CP4) locations. At this time, a candidate composed of at least two CPMV combinations may be derived. Meanwhile, if all motion vectors of a neighboring block used to derive a CPMV combination have the same reference index, the combined affine candidate may be added to the sub-block unit merge candidate list.

For example, a first existent/available motion vector of locations H, I and G of FIG. 15 may be determined as CP1 which is the top left CPMV.

As another example, a first existent/available motion vector of locations N and O of FIG. 15 may be determined as CP2 which is the top right CPMV.

As another example, a first existent/available motion vector of locations B and A of FIG. 15 may be determined as CP3 which is the bottom left CPMV.

As another example, a motion vector present at a location of a reference block P of a picture encoded/decoded before the picture of FIG. 15 may be determined as CP4 which is the bottom right CPMV.

At this time, four CPMVs (CP1, CP2, CP3, CP4) are combined in order of {CP1, CP2, CP3}, {CP1, CP2, CP4}, {CP1, CP3, CP4}, {CP2, CP3, CP4}, {CP1, CP2} and {CP1, CP3} to derive a combined affine candidate and the CPs of any one candidate have the same reference index, the combined affine candidate may be added to the sub-block unit merge candidate list.

If the number of candidates included in the sub-block unit merge candidate list does not satisfy a maximum number of candidates of the sub-block unit merge candidate list, zero sub-block unit merge candidates composed of zero motion information (zero CPMV) may be added to the sub-block unit merge candidate list until the number of candidates included in the sub-block unit merge candidate list becomes the maximum number of candidates of the sub-block unit merge candidate list.

If the inter prediction mode of the current block is determined as a sub-block unit skip mode, a skip merge candidate list may be derived in sub-block units. For example, the sub-block unit skip merge candidate list may be composed of N pieces of inter prediction information. A method of deriving the sub-block unit skip merge candidate list may be equal to a method of deriving the sub-block unit merge candidate list.

If the inter prediction mode of the current block is determined as a sub-block based AMVP mode, an AMVP candidate list may be derived in sub-block units. For example, the AMVP candidate list of the sub-block unit may be composed of N pieces of inter prediction information.

The sub-block unit AMVP candidate list may be configured using at least one of the ATMVP, the inherited affine inter prediction information, the combined affine inter prediction information or the zero affine motion prediction information.

The inherited affine inter prediction information may be a CPMVP derived from the CPMV of the spatial neighboring block encoded/decoded in the affine mode. The CPMV of the spatial neighboring block may be a sub-block unit motion vector at a top left, top right or bottom left location of blocks encoded/decoded in the affine mode. In addition, the CPMVP of the current block may be derived by applying scaling based on the widths and heights of the current block and the neighboring block to the CPMV of the neighboring block. The CPMV may be derived from the spatial neighboring blocks of locations A, B, . . . , H and O of FIG. 15, and one or more inherited affine candidates composed of at least two CPMVP combinations derived in a predetermined order may be derived. The CPMV of the current block may be derived through additional operation of the CPMVP, and a CPMVD (CPMV difference) between the CPMV and the CPMVP may be additionally signaled.

For example, two CPMVP combinations may be sub-block unit motion vector combinations derived at the top left and top right locations of the current block. An affine mode in which two CPMVPs are derived may be defined as a 4-parameter mode.

As another example, three CPMVP combinations may be sub-block unit motion vector combinations derived at the top left, top right and bottom left locations of the current block. An affine mode in which three CPMVPs are derived may be defined as a 6-parameter mode.

At this time, a left neighboring block may be at least one of blocks at locations A, B, C, . . . , F and G, and at least one piece of inter prediction information may be derived in a predetermined order. For example, one or more pieces of inter prediction information may be derived in order of A and B of FIG. 15.

Meanwhile, a top neighboring block may be at least one of blocks at locations H, I, J, . . . , N and O, and at least one piece of inter prediction information may be derived in a predetermined order. For example, one or more pieces of inter prediction information may be derived in order of O, N and H of FIG. 15.

The combined affine inter prediction information may be derived through a combination of motion vectors of neighboring blocks adjacent to top left (CP1), top right (CP2), bottom left (CP3) bottom right (CP4) locations. At this time, a candidate composed of at least two CPMVP combinations may be derived. Meanwhile, if all motion vectors of a neighboring block used to derive a CPMVP combination have the same reference index, the combined affine candidate may be added to the sub-block unit AMVP candidate list.

For example, a first existent/available motion vector of locations H, I and G of FIG. 15 may be determined as CP1 which is the top left CPMVP.

As another example, a first existent/available motion vector of locations N and O of FIG. 15 may be determined as CP2 which is the top right CPMVP.

As another example, a first existent/available motion vector of locations B and A of FIG. 15 may be determined as CP3 which is the bottom left CPMVP.

Meanwhile, for example, in the case of the 4-parameter mode, the motion vectors of the top left (CP1) and top right (CP2) may be used as a CPMVP combination. As another example, in the case of the 6-parameter mode, the motion vectors of the top left (CP1), the top right (CP2) and the bottom left (CP3) may be used as a CPMVP combination.

The number of candidates included in the sub-block unit AMVP candidate list does not satisfy a maximum number of candidates of the sub-block unit AMVP candidate list, zero sub-block unit AMVP candidates composed of zero motion information (zero CPMVP) may be added to the sub-block unit AMVP candidate list until the number of candidates included in the sub-block unit AMVP candidate list becomes the maximum number of candidates of the sub-block unit AMVP candidate list.

If the inter prediction mode of the current block is determined as an MMVD mode, an MMVD candidate list may be configured. For example, the MMVD candidate list may be composed of N pieces of inter prediction information.

The MMVD candidate list may be configured using the merge or AMVP candidate list. For example, the MMVD candidate list may be composed of two top candidates of the merge candidate list. As another example, the MMVD candidate list may be composed of two top candidates of the AMVP candidate list.

Inter prediction for the current block may be performed by combining the MMVD candidate, motion direction information and motion size information.

For example, additional motion direction information of up, down, left and right may be signaled with respect to the motion vector of the candidate, and motion size information indicating at least one size of [1/4, 1/2, 1, 2, 4, 8, 16, 32] may be signaled.

If the inter prediction mode of the current block is determined as a CIIP mode, a CIIP candidate list may be derived. For example, the inter prediction candidate list of the CIIP mode may be determined as a merge candidate list.

The CIIP mode may mean a prediction mode obtained by combining intra prediction and inter prediction.

For example, in deriving the intra prediction mode of the CIIP mode, a specific intra prediction mode may be fixedly used. As another example, the intra prediction mode of the CIIP mode may be derived using a Most Probable Mode (MPM).

The intra prediction mode of the current block may be derived using the intra prediction modes of the top and left neighboring blocks.

For example, if the intra prediction modes of the top and left neighboring blocks are the same, the mode may be derived as the intra prediction mode of the current block. As another example, if the intra prediction modes of the top and left neighboring blocks are not the same, the intra prediction mode of the left neighboring block may be derived as the intra prediction mode of the current block. As another example, if the intra prediction modes of the top and left neighboring blocks are not the same, the intra prediction mode of the top neighboring block may be derived as the intra prediction mode of the current block.

As another example, if the intra prediction modes of the top and left neighboring blocks are not the same and both the intra prediction modes of the top and left neighboring blocks are directional modes, an intra prediction mode having an average value of the intra prediction mode values of the top and left neighboring blocks may be derived as the intra prediction mode of the current block.

As another example, if the intra prediction modes of the top and left neighboring blocks are not the same and at least one of the intra prediction modes of the top and left neighboring blocks is a non-directional mode, the non-directional intra prediction mode may be derived as the intra prediction mode of the current block.

As another example, if the intra prediction modes of the top and left neighboring blocks are not the same and both the intra prediction modes of the top and left neighboring blocks are non-directional modes, a PLANAR mode may be derived as the intra prediction mode of the current block.

As another example, if the intra prediction mode is capable of being derived with respect to one of the top and left neighboring blocks, the intra prediction mode of a block in which the intra prediction mode is capable of being derived may be derived as the intra prediction mode of the current block.

The prediction block of the current block may be derived through an average of the prediction block according to each of the intra prediction mode and the inter prediction mode.

In applying the CIIP mode, an applied weight may be determined according to the locations B and J.

For example, if an intra prediction information ratio of a neighboring block is high, a large weight may be assigned to the intra prediction mode. As another example, if an inter prediction information ratio of neighboring blocks is high, a large weight may be assigned to the inter prediction mode. As another example, if the prediction mode ratios of the neighboring blocks are the same, the same weight may be assigned.

Figure 16:
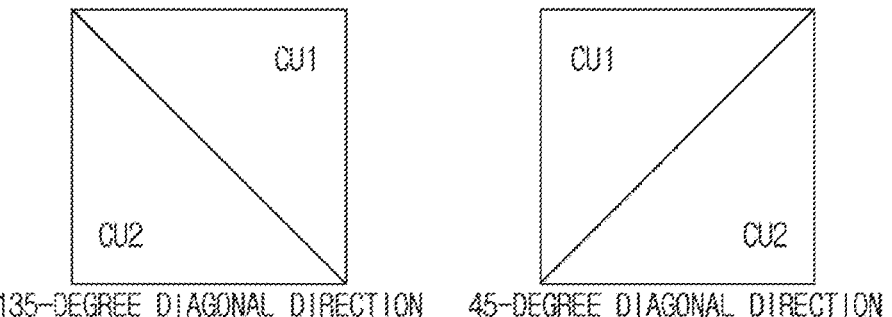
FIG. 16 is a view illustrating a method of applying a triangular prediction mode (TPM) according to an embodiment of the present disclosure.

FIG. 16 is a view illustrating a method of applying a triangular prediction mode (TPM) according to an embodiment of the present disclosure.

The TPM may refer to a prediction mode in which a plurality of prediction blocks is generated with respect to a current block and a final prediction block of the current block is generated by applying a weighted sum for each prediction location to each prediction block. As a result of TPM prediction, the prediction blocks may be acquired by partitioning the current block in a triangular shape. For example, the TPM is applicable to a block having a size of 8×8.

If the inter prediction mode of the current block is determined as a TPM, a candidate list for the TPM (TPM candidate list) may be derived. The candidate list for the TPM may be composed of N pieces of inter prediction information. At this time, the candidate list for the TPM may be derived in the same manner as a merge or AMVP candidate list or may be derived using the merge or AMVP candidate list.

For example, the TPM candidate list may be derived using the merge candidate list. For example, the number of candidates included in the TPM candidate list may be 6 or more.

Candidates 0, 2 and 4 of the TPM candidate list may be derived using the motion information of an L0 reference picture list of corresponding merge candidates. If motion information is not present in the reference picture list, candidates 0, 2 and 4 may be derived using motion information present in the reference picture list in an opposite direction (e.g., L1).

Candidates 1, 3 and 5 of the TPM candidate list may be derived using the motion information of an L1 reference picture list of corresponding merge candidates. If motion information is not present in the reference picture list, candidates 1, 3 and 5 may be derived using motion information present in the reference picture list in an opposite direction (e.g., L0).

As another example, the TPM candidate list may be derived using the AMVP candidate list.

Candidate 0 of the TPM candidate list may be derived using the motion information of an L0 reference picture list of a corresponding AMVP candidate. If motion information is not present in the reference picture list, candidate 0 may be derived using motion information present in the reference picture list in an opposite direction (e.g., L1).

Candidate 1 of the TPM candidate list may be derived using the motion information of an L1 reference picture list of a corresponding AMVP candidate. If motion information is not present in the reference picture list, candidate 0 may be derived using motion information present in the reference picture list in an opposite direction (e.g., L0).

Two or more prediction blocks may be derived using two pieces or more of motion information of the configured TPM candidate list, and the final prediction block of the current block may be derived by applying a weighted sum of the derived prediction blocks.

For example, as a TPM result, as shown in FIG. 16, a final prediction block may be derived by partitioning the prediction block in a diagonal direction of 45 degrees or 135 degrees.

Figures 17, 18:
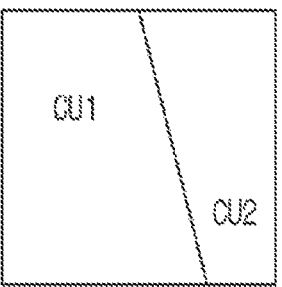
FIG. 17 is a view illustrating a weight applicable to a TPM according to an embodiment of the present disclosure.
FIG. 18 is a view illustrating a method of applying a geometric prediction mode (GPM) according to another embodiment of the present disclosure.

FIG. 17 is a view illustrating a weight applicable to a TPM according to an embodiment of the present disclosure.

FIG. 17 shows an example of a weight applicable to a TPM. The weight of FIG. 17 may be applied to a first prediction block CUI, for example.

If the TPM is applied to the current block, the first prediction block of the current block may be derived using first motion information, and the second prediction block of the current block may be derived using second motion information. The weight of FIG. 17 may be applied to the first prediction block. Although not shown in FIG. 17, a weight applied to the second prediction block may be symmetrical to a weight used to derive the first prediction block with respect to a partitioning boundary line of the block. For example, in order to derive the first prediction block, weights of {7/8, 6/8, 4/8, 2/8, 1/8} may be used according to the sample location and, in order to derive the second prediction block, weights of {1/8, 2/8, 4/8, 6/8, 7/8} may be used.

If the TPM is applied to a luma block having a size of M×M, a chroma block corresponding to the luma block may have a size of M/2×M/2. At this time, the weight applied to the chroma block may be determined to correspond to the weight of the luma block. For example, if a weight applied to an 8×8 luma block is {7/8, 6/8, 4/8, 2/8, 1/8}, the weight applied to a 4×4 chroma block corresponding thereto may be determined as {7/8, 4/8, 1/8}.

If the first prediction block and the second prediction block are derived, a final prediction block of the current block may be derived through a weighted sum of the first prediction block and the second prediction block.

FIG. 18 is a view illustrating a method of applying a geometric prediction mode (GPM) according to another embodiment of the present disclosure.

Like the TPM, the GPM may refer to a prediction mode in which a plurality of prediction blocks is generated with respect to a current block and a final prediction block of the current block is generated by applying a weighted sum for each prediction location to each prediction block. As a result of TPM prediction, prediction blocks partitioned in a triangular shape may be acquired, while, as a result of GPM prediction, prediction blocks obtained by partitioning the current block along an arbitrary boundary line may be acquired.

That is, if the partitioning boundary line of the GPM corresponds to a diagonal line partitioning the current block in a triangular shape, operation of the GPM may be equal to that of the TPM. That is, the TPM may be an example of the GPM.

For example, the GPM is applicable only when the sub-block based merge mode is not applied to the current block. In addition, whether to apply the GPM may be determined based on the size of the current block. For example, if the size of the current block is 8×8 or greater, the GPM is applicable to the current block. In addition, if the width of the current block is less than the height of the current block and/or if the height of the current block is less than the width of the current block, the GPM is applicable. In addition, the GPM is applicable only when the CIIP mode is not applied to the current block.

If the inter prediction mode of the current block is determined as a GPM, a candidate list (GPM candidate list) for the GPM may be derived. The candidate list for the GPM may be composed of N pieces of inter prediction information. At this time, the candidate list for the GPM may be derived in the same manner as the merge or AMVP candidate list or may be derived using the merge or AMVP candidate list.

For example, the GPM candidate list may be derived using the merge candidate list. For example, the number of candidates included in the GPM candidate list may be 6 or more.

Candidates 0, 2 and 4 of the GPM candidate list may be derived using the motion information of an L0 reference picture list of corresponding merge candidates. If motion information is not present in the reference picture list, candidates 0, 2 and 4 may be derived using motion information present in the reference picture list in an opposite direction (e.g., L1).

Candidates 1, 3 and 5 of the GPM candidate list may be derived using the motion information of an L1 reference picture list of corresponding merge candidates. If motion information is not present in the reference picture list, candidates 1, 3 and 5 may be derived using motion information present in the reference picture list in an opposite direction (e.g., L0).

As another example, the GPM candidate list may be derived using the AMVP candidate list.

Candidate 0 of the GPM candidate list may be derived using the motion information of an L0 reference picture list of a corresponding AMVP candidate. If motion information is not present in the reference picture list, candidate 0 may be derived using motion information present in the reference picture list in an opposite direction (e.g., L1).

Candidate 1 of the GPM candidate list may be derived using the motion information of an L1 reference picture list of a corresponding AMVP candidate. If motion information is not present in the reference picture list, candidate 0 may be derived using motion information present in the reference picture list in an opposite direction (e.g., L0).

Two or more prediction blocks may be derived using two pieces or more of motion information of the configured GPM candidate list may be derived, and the final prediction block of the current block may be derived by applying a weighted sum of the derived prediction blocks.

For example, if the partitioning boundary of the GPM corresponds to a diagonal line of 45 degrees or 135 degrees, GPM operation may be equal to TPM operation.

FIG. 18 shows an example of a partitioning boundary line applied to the GPM. For example, the GPM partitioning boundary line may be expressed as a combination of a distance from the block center of the current block to the boundary line and the angle of the boundary line.

FIG. 19 is a view illustrating a weight applicable to a GPM according to another embodiment of the present disclosure.

FIG. 19 shows an example of a weight applicable to a GPM block, to which the partitioning boundary line of FIG. 18 is applied. The weight of FIG. 19 may be applied to a first prediction block CUI, for example.

If the GPM is applied to the current block, the first prediction block of the current block may be derived using first motion information, and the second prediction block of the current block may be derived using second motion information. The weight of FIG. 19 may be applied to the first prediction block. Although not shown in FIG. 19, a weight applied to the second prediction block may be symmetrical to a weight used to derive the first prediction block with respect to a partitioning boundary line of the block. For example, in order to derive the first prediction block, weights of {7/8, 6/8, 4/8, 2/8, 1/8} may be used according to the sample location and, in order to derive the second prediction block, weights of {1/8, 2/8, 4/8, 6/8, 7/8} may be used.

If the GPM is applied to a luma block having a size of M×M, a chroma block corresponding to the luma block may have a size of M/2×M/2. At this time, the weight applied to the chroma block may be determined to correspond to the weight of the luma block. For example, if a weight applied to an 8×8 luma block is {7/8, 6/8, 4/8, 2/8, 1/8}, the weight applied to a 4×4 chroma block corresponding thereto may be determined as {7/8, 4/8, 1/8}.

If the first prediction block and the second prediction block are derived, a final prediction block of the current block may be derived through a weighted sum of the first prediction block and the second prediction block.

Hereinafter, a method of determining a weight of each sample location of a current block will be described in detail.

The weight of each sample location of a current luma block may be derived based on a distance of the sample from the boundary line and the angle of the boundary line.

For example, the weight of the sample location (x, y) may be derived according to Equation 1 below.

Equation 1

$$distFromLine = ((x << 1) + 1) * Dis[displacementX] + ((y << 1) + 1)) *$$

$$Dis[displacementY] - rho$$

$$distScaled = \min((abs(distFromLine) + 8) >> 4, 14)$$

$$sampleWeight[x][y] =$$

$$distFromLine <= 0 \text{ ? } GeoFilter[distScaled]: 8 - GeoFilter[distScaled]$$

In Equation 1 above, distFromLine may be a value determined based on a distance between a current sample and a boundary line. In addition, distScaled may be a variable which corrects a distFromline value to be included in a specific range. sampleWeight[x][y] may mean the weight of the current sample location (x, y). displacementX and displacementY may be values determined according to the boundary line.

As another example, the weight applied to the current luma sample may be determined based on Equation 2 to Equation 5 below.

$$shift1 = \text{Max}(5, 17 - BitDepth)$$

Equation 2

$$offset1 = 1 << (shift1 - 1)$$

$$displacementX = angleIdx$$

$$displacementY = (angleIdx + 8) \% 32$$

$$partFlip = (angleIdx >= 13 \&\& angleIdx <= 27) \text{ ? } 0:1$$

$$shiftHor =$$

$$(angleIdx \% 16 == 8 || (angleIdx \% 16 != 0 \&\& nH >= nW)) \text{? } 0:1$$

In Equation 2, angleIdX may be a variable determined based on the angle of the boundary line. A signaling method of information for determining the GPM boundary line of the current will be described below. ShiftHor may be a variable indicating whether the boundary line of the current block is a horizontal boundary line or a vertical boundary line. In addition, partFlip may indicate a variable indicating one of two sub-blocks partitioned along the GPM boundary line.

Offset values offsetX and offset for determining the weight of the current sample based on the variable determined in Equation 2 may be determined according to Equation 3 and Equation 4 below. Hereinafter, operation of Equation 3 may be performed when ShiftHor has a first value, and operation of Equation 4 may be performed when ShiftHor has a second value.

$$offsetX = (-nW) >> 1$$

Equation 3

$$offsetY = ((-nH) >> 1) +$$

$$\left( angleIdx < 16 \text{ ? } (distanceIdx * nH) >> 3: - ((distanceIdx * nH) >> 3) \right)$$

Equation 4

$$offsetX = ((-nW) >> 1) +$$

$$\left( angleIdx < 16 \text{ ? } (distanceIdx * nW) >> 3: - ((distanceIdx * nW) >> 3) \right)$$

$$offsetY = (-nH) >> 1$$

The weight of the current luma sample location (xL, yL) based on the offset values determined by Equation 3 and Equation 4 may be determined according to Equation 5 below.

Equation 5

$$weightIdx = (((xL + offsetX) << 1) + 1) * distLut[displacementX] +$$

$$(((yL + offsetY) << 1) + 1)) * distLut[displacementY]$$

$$weightIdxL = partFlip \text{ ? } 32 + weightIdx:32 - weightIdx$$

$$wValue = Clip3(0, 8, (weightIdxL + 4) >> 3)$$

In Equation 5, weightIdx may mean an index value used to derive the weight, and disLut[ ] may be determined by displacementX and displacement, and may be determined based on Table 1 below. wValue may be a finally derived weight.

TABLE 1

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

When wValue determined based on the location of the current sample and the partitioning boundary line is derived, the final prediction block of the current block may be derived according to Equation 6 below.

Equation 6

$$pbSamples[x][y] =$$

$$Clip3(0, (1 << BitDepth) - 1, (predSamplesLA[x][y] * wValue +$$

$$predSamplesLB[x][y] * (8 - wValue) + offset1) >> shift1)$$

In Equation 6, pbSamples[x][y] may mean the final prediction sample of the current block, and predSamplesLA and predSamplesLB may respectively mean the sample values of the first prediction block and the second prediction block.

If the prediction block is a luma block, (xL, yL) may be determined in the same manner as (x, y). On the contrary, if the prediction block is a chroma block, (xL, yL) may be determined as a value obtained by scaling the value of (x, y) according to the chroma format.

That is, the weight of the chroma component may be derived in consideration of the chroma format and a correspondence relationship between the chroma block and the luma block according to the chroma format.

FIGS. 20 to 24 are views illustrating a weight applicable to a chroma block, to which a GPM according to several embodiments of the present disclosure is applied.

If the weight of the chroma block is derived, the weight of the chroma sample may be derived using the weight of the luma component at the same location or corresponding location.

In case of the format of 4:2:0, the block size of the chroma component may be 1/2 the block size of the luma component in terms of the width and the height.

For example, as shown in FIG. 20, the weight of each chroma component sample may be determined as a weight of a top left location among the weights of the luma component sample at the corresponding location.

As another example, as shown in FIG. 21, the weight of each chroma component sample may be determined as an average of the weights of the top left location and the bottom right location among the weights of the luma component sample at the corresponding location.

As another example, as shown in FIG. 22, the weight of each chroma component sample may be determined as an average of the weights of all luma component samples at the corresponding location.

In case of the format of 4:2:2, the block size of the chroma component may be 1/2 the block size of the luma component in terms of the width.

For example, as shown in FIG. 23, the weight of each chroma component sample may be determined as a weight of a left location among the weights of the luma component sample at the corresponding location.

As another example, as shown in FIG. 21, the weight of each chroma component sample may be determined as an average of the weights of the left location and the right location among the weights of the luma component sample at the corresponding location.

Next, steps S840 and S930 of acquiring/determining the motion information of the current block will be described in detail.

In the following description, the process of determining/ acquiring the motion information may be used as the same meaning as the process of storing the motion information using motion candidates.

An image encoding/decoding apparatus may be used to store motion information and derive the motion information of a picture or block to be encoded/decoded.

The motion information may include at least one of a motion vector, a reference picture list or a reference picture index.

If the merge mode is applied to the current block, motion information indicated by a merge index may be stored. For example, the motion vector, the reference picture list and the reference picture index of the merge candidate indicated by the merge index may be stored.

If the AMVP mode is applied to the current block, motion information indicated by an AMVP index may be stored. For example, a motion vector derived by performing additional operation based on the MVP indicated by the AMVP index may be stored. Here, the additional operation may mean step of deriving a final motion vector through a sum of the MVP and the MVD. In addition, a reference picture list and a reference picture index indicated by the AMVP index may be stored.

If the MMVD mode is applied to the current block, an MMVD index, motion direction information and motion size information may be stored. For example, motion direction information determined as at least one of up, down, left and right and motion size information indicating a size determined as at least one of [1/4, 1/2, 1, 2, 4, 8, 16, 32] may be stored. In addition, a reference picture list and a reference picture index indicated by the MMVD index may be stored.

If the inter prediction mode of the current block is determined as a sub-block based inter mode, a sub partition inter prediction mode storage method may be used.

If the sub-block based merge mode is applied to the current block, motion information indicated by a sub-block based merge index may be stored. In addition, a motion vector for each sub-block derived from the CPMV may be stored. As another example, the motion vector for each sub-block derived from the CPMVP may be stored.

If the inter prediction mode of the current block is determined as at least one of a CIIP mode, a TPM or a GPM, a combined inter prediction mode storage method may be used.

If the CIIP mode is applied to the current block, motion information indicated by the merge or AMVP index may be stored. For example, a motion vector, a reference picture list and a reference picture index indicated by the merge or AMVP index may be stored.

If the TPM or GPM is applied to the current block, a combination of motion information indicated by different TPM or GPM indices may be stored. For example, a motion vector, a reference picture list and a reference picture index indicated by different TPM or GPM indices may be stored.

FIGS. 25 to 27 are views illustrating a method of encoding/decoding motion information of a block, to which a TPM or GPM according to several embodiments of the present disclosure is applied.

For example, if the TPM or GPM is applied, as shown in FIG. 25, bidirectional motion information may be stored with respect to a block located on a boundary surface and only unidirectional motion information may be stored with respect to a block which is not located on the boundary surface.

As another example, if the TPM or GPM is applied, as shown in FIG. 26 or 27, only unidirectional motion information may be stored for each sub-block. One of L0 and L1 motion information may be stored with respect to the block located on the boundary surface.

FIGS. 28 to 30 are other views illustrating a method of encoding/decoding motion information of a block, to which a GPM according to several embodiments of the present disclosure is applied.

If the GPM is applied to the current block, motion information stored using a weight may be determined.

FIGS. 28 to 30 show a method of storing GPM motion information of a 4×4 block.

For example, as shown in FIG. 28, the sum of the weights of at least one sample location of the top left, top right, bottom left or bottom right location of a block to be stored.

As another example, as shown in FIGS. 29 and 30, the sum of the weights of at least one of the samples on the boundary line of a block to be stored.

At this time, the type of the motion information stored by comparing the sum of the weights with a specific threshold may be determined.

For example, thresholds Th_1 and Th_2 may be defined according to Equation 7 below.

$$\text{Equation 7}$$

$$Th\_1 = \max(((8*\text{the number of used weight samples}) >> thScaler),$$

$$1*\text{the number of used weight samples})$$

$$Th\_2 = (8*\text{the number of used weight samples}) - Th\_1$$

$$thScaler = ((\log\_2 h + \log\_2 w) >> 1) - 1$$

For example, if the sum of the weights is less than or equal to Th_1, the motion information of a first candidate may be stored.

As another example, if the sum of the weights is greater than or equal to Th_2, the motion information of a second candidate may be stored.

As another example, if the sum of the weights is less than Th_2 and is greater than Th_1, the motion information of the first candidate and the second candidate may be bidirectionally stored.

As another example, if reference picture lists indicated by different GPM indices are different, the motion information of the first candidate and the second candidate may be bidirectionally stored.

As another example, if reference picture lists indicated by different GPM indices are the same, the motion information of the second candidate may be bidirectionally stored.

As another example, if a merge index used to derive the GPM index is bidirectional, motion information may be bidirectionally stored.

As another example, if a merge index used to derive the GPM index is unidirectional, motion information may be unidirectionally stored.

As another example, if a merge index used to derive the GPM index is unidirectional, motion information may be bidirectionally stored. At this time, motion information may be bidirectionally stored by assigning unidirectional motion information as motion information in an unused direction.

As another example, if reference picture lists indicated by different GPM indices are the same, the motion information acquired by scaling the first candidate and the motion information of the first candidate may be bidirectionally stored.

Next, steps S810 and S940 of encoding/decoding inter prediction information of the current block will be described in detail.

In entropy-coding/decoding of information indicating an inter prediction mode, information indicating an inter prediction mode may be entropy-encoded and decoded based on at least one single inter prediction mode information, multiple inter prediction mode information or combined inter prediction mode information.

At this time, the inter prediction mode may mean at least one of a merge mode, an AMVP mode, a sub-block based merge mode, a sub-block based AMVP mode, an MMVD, a CIIP, a TPM or a GPM.

The single inter prediction mode information may indicate whether to apply one inter prediction mode.

For example, a merge flag merge_flag indicating whether to apply the merge mode may be encoded/decoded.

As another example, an MMVD flag mmvd_flag indicating whether to apply the MMVD mode may be encoded/decoded.

As another example, a TPM flag triangle_flag indicating whether to apply the TPM may be encoded/decoded.

As another example, a CIIP flag ciip_flag indicating whether to apply the CIIP may be encoded/decoded.

As another example, a GPM flag geo_flag/gpm_flag indicating whether to apply the GPM may be encoded/decoded.

The multiple inter prediction mode information may indicate an inter prediction mode combination including a plurality of inter prediction modes. At this time, single inter prediction mode information indicating a specific inter prediction mode in the combination may be additionally encoded/decoded. Meanwhile, the single inter prediction mode information may be expressed as an index rather than a specific indicator. At this time, the single inter prediction mode information may be entropy-encoded/decoded according to the order of prediction mode determination.

For example, if the multiple inter prediction mode indicator indicates a merge mode, the multiple inter prediction mode indicator may indicate that the current block is encoded/decoded using at least one of a merge mode, an MMVD mode, a sub-block based mode, a TPM, a CIIP mode or a GPM.

FIGS. 31 to 35 are views illustrating a method of encoding/decoding intra prediction mode information according to several embodiments of the present disclosure.

Figure 31:
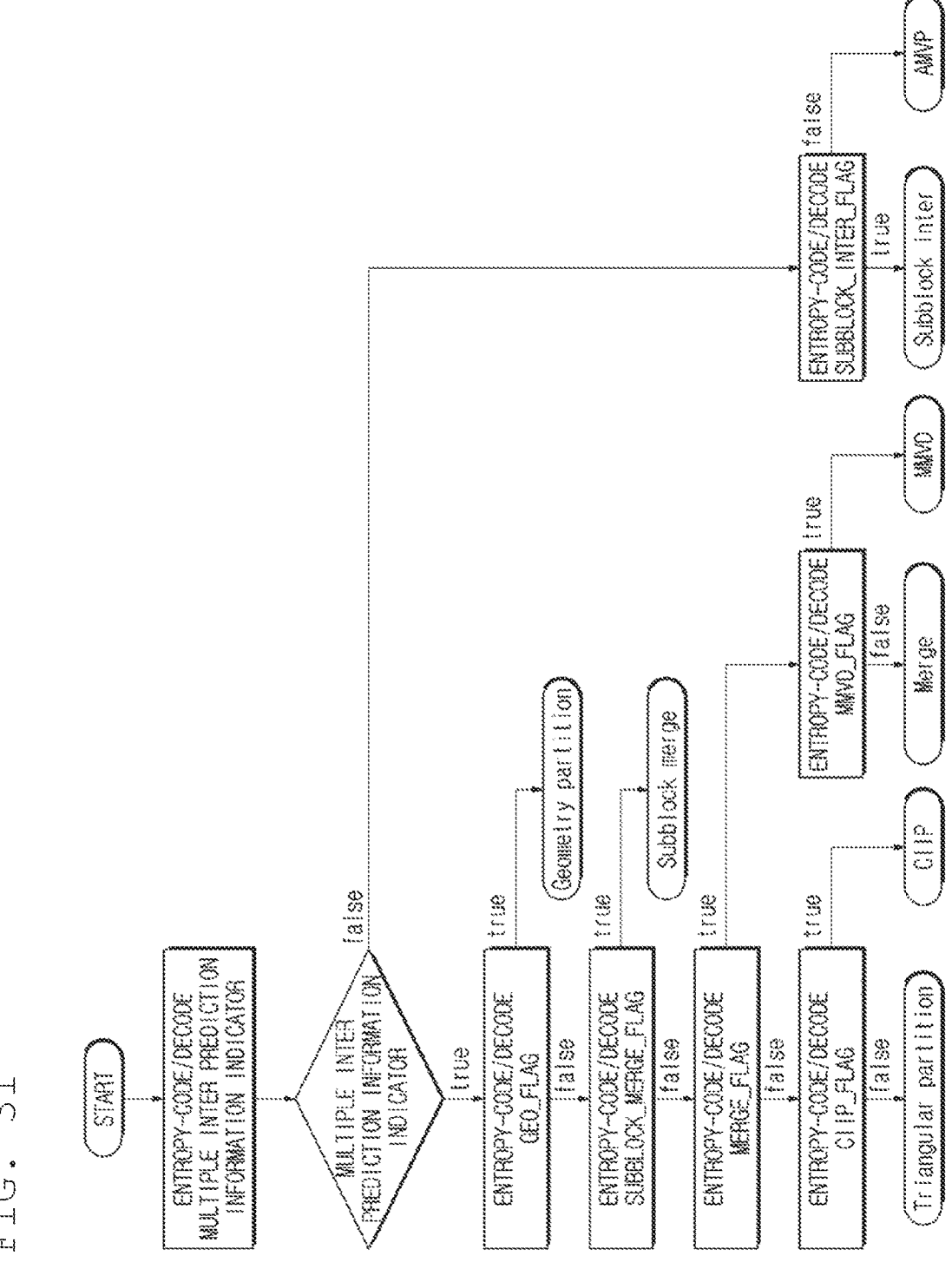
Figure 32:
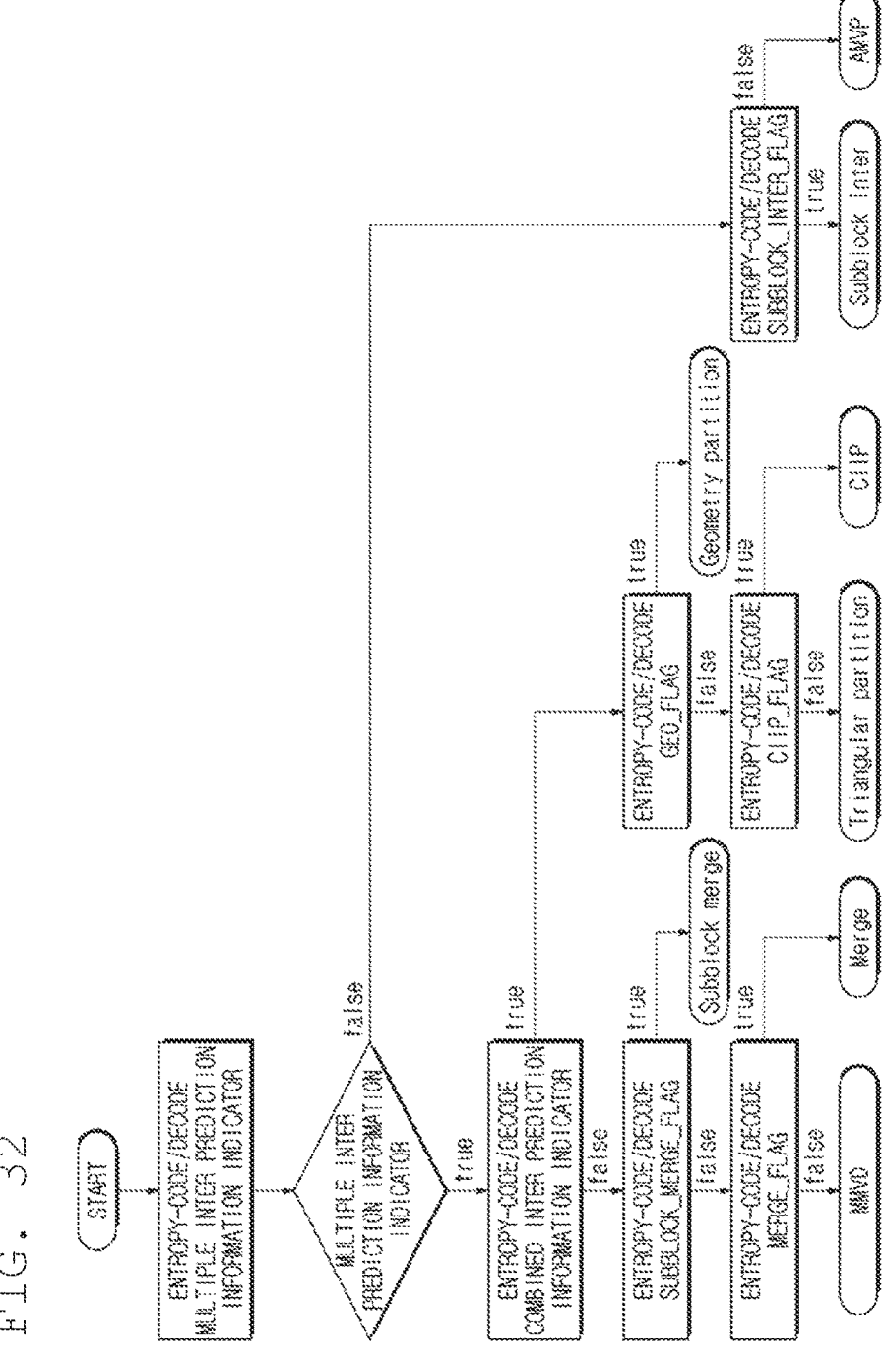

For example, as shown in FIGS. 31 to 33, if the multiple inter prediction mode indicator has a first value, the current block may be encoded/decoded using a merge mode, an MMVD mode, a sub-block based mode, a TPM, a CIIP mode or a GPM.

As another example, the combined inter prediction information indicator of FIGS. 32 and 33 may indicate that the current block is encoded/decoded using at least one of a TPM, a CIIP mode or a GPM.

Figure 34:
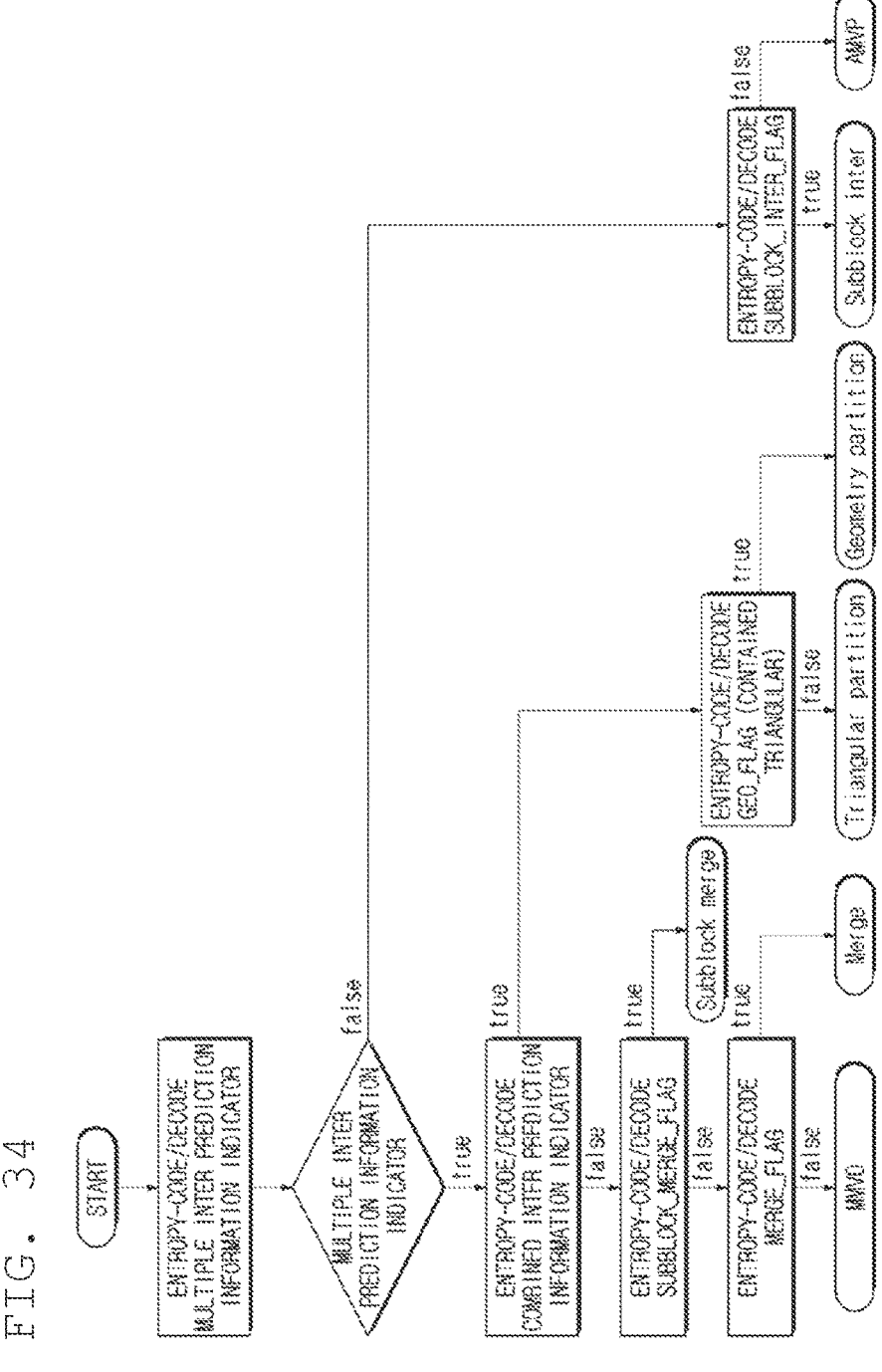

As described above, if the TPM is an example of the GPM, an inter prediction information indicator may be encoded/decoded according to FIGS. 34 and 35.

Hereinafter, a method of encoding/decoding GPM related information when the GPM is applied to the current block will be described in detail.

First, a syntax element sps_gpm_enabled_flag indicating whether the GPM is applicable to the current block may be signaled. The syntax element indicating whether the GPM is applicable may be signaled at a sequence level.

Whether to apply the GPM to the current block may be determined without signaling of a flag indicating whether to perform a separate GPM. For example, it may be determined that the sub-block based merge mode is not applied to the current block if the GPM is applicable to the current block and the current block is included in a B slice and that the GPM is applied to the current block if the size of the current block is 8×8 or greater and the CIIP mode is not applied to the current block.

If the normal merge mode or the MMVD mode is not applied to the current block and the CIIP mode is not applied to the current block, a GPM partitioning index may be encoded/decoded. For example, the GPM partitioning index may be defined as a syntax element merge_gpm_partition_idx.

The syntax element merge_gpm_partition_idx may be used to determine the GPM partitioning boundary line or the partitioning form of the block. Specifically, the GPM partitioning index may indicate at least one of a distance from the center of the current block to the GPM partitioning boundary line or the angle of the GPM partitioning boundary line.

For example, the GPM partitioning index may determine the form of the GPM partitioning boundary line according to Table 2 below.

TABLE 2

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |

| merge_gpm_partition_idx | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

TABLE 2-continued

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 26 | 20 | 20 | 21 |
| distanceIdx | 0 | 1 | 2 | 3 | 1 | 3 | 1 | 2 | 3 | 1 | 2 | 3 | 1 | 2 | 3 | 1 |

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 | angleIdx and distanceIdx of Table 2 may be syntax elements indicating the angle of the GPM partitioning boundary line and the distance from the center of the current block to the GPM partitioning boundary line. angleIdx and distanceIdx may be defined as an angle index and a distance index, respectively.

FIGS. 36 and 37 are views illustrating a method of entropy-encoding/decoding GPM information.

As another example, the GPM partitioning index may determine a GPM partitioning boundary line or the partitioning form of the block based on FIG. 36.

Meanwhile, binarization of the GPM partitioning index may be performed using at least one method of a truncated Unary code, a k-th exponential Golomb code or a fixed-length code. Meanwhile, if the fixed-length code is not applied, fewer binary bits may be assigned to indices which occur frequently according to the probability of occurrence, thereby improving encoding efficiency.

In addition, binarization of the angle index and the distance index may be performed using at least one method of a truncated Unary code, a k-th exponential Golomb code or a fixed-length code. For example, the angle index and the distance index may be assigned binary values based on the binary table of FIG. 37. The angle index may be expressed as a fixed length and the distance index may be expressed as a truncated Unary code. Meanwhile, if the fixed-length code is not applied, fewer binary bits may be assigned to indices which occur frequently according to the probability of occurrence, thereby improving encoding efficiency.

Hereinafter, bidirectional inter prediction encoding/decoding methods according to several embodiments of the present disclosure will be described in detail.

Figure 38:
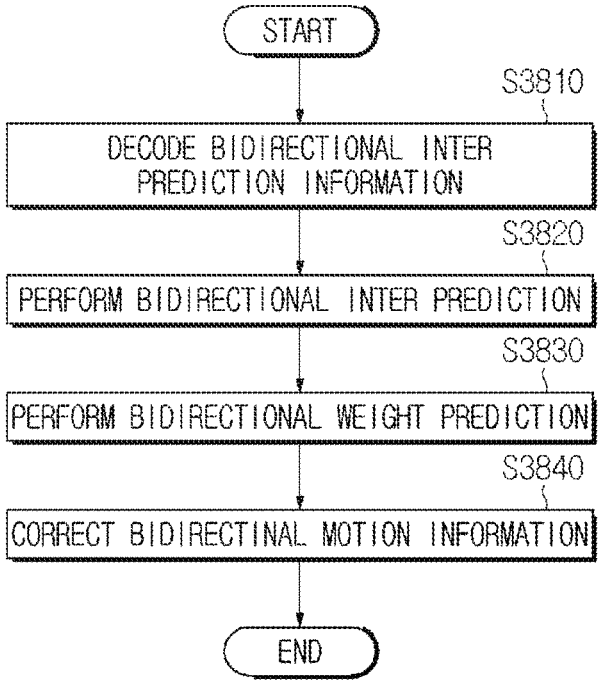
FIG. 38 is a view illustrating an image decoding method according to another embodiment of the present disclosure.

FIG. 38 is a view illustrating an image decoding method according to another embodiment of the present disclosure.

Referring to FIG. 38, the image decoding method according to an embodiment of the present disclosure may include decoding bidirectional inter prediction information of a current block (S3810), performing bidirectional inter prediction with respect to the current block (S3820), performing bidirectional weight prediction with respect to the current block (S3830) and/or improving/correcting bidirectional motion information (S3840).

Figure 39:
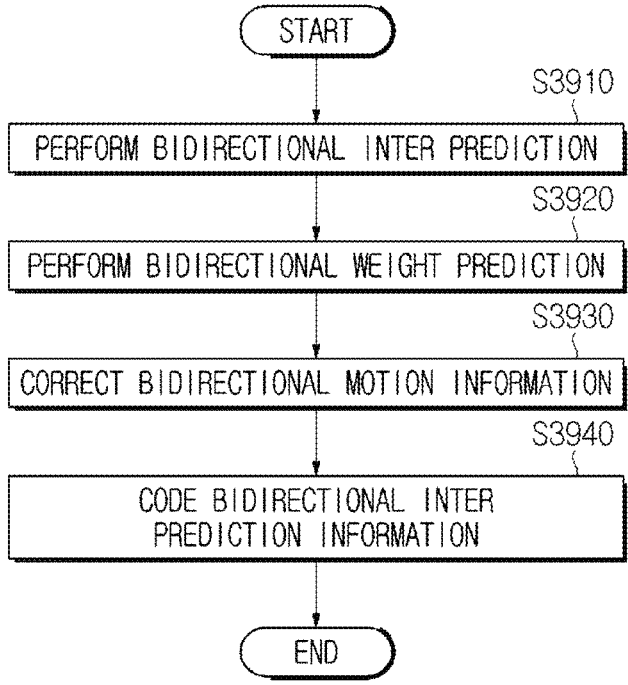
FIG. 39 is a view illustrating an image encoding method according to another embodiment of the present disclosure.
Figure 40:
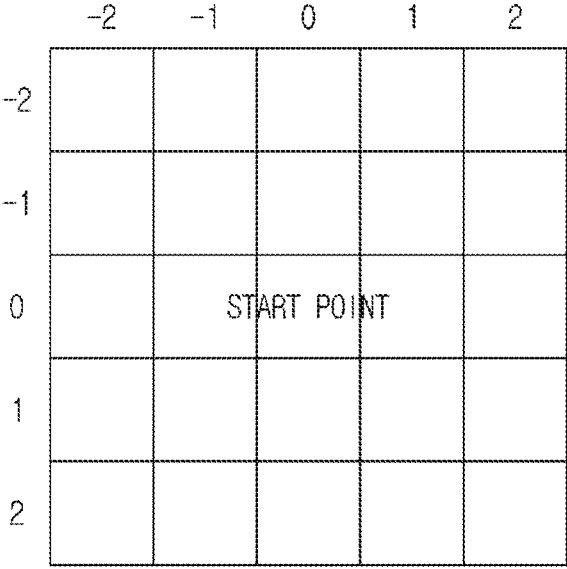
FIG. 40 is a view illustrating an image decoding method according to another embodiment of the present disclosure.
Figure 41:
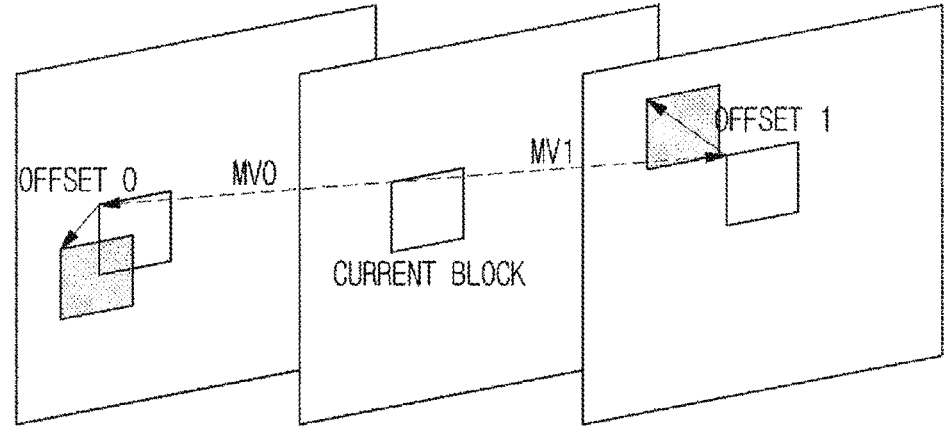
FIG. 41 is a view illustrating an image encoding method according to another embodiment of the present disclosure.

FIG. 39 is a view illustrating an image encoding method according to another embodiment of the present disclosure.

Referring to FIG. 39, the image decoding method according to an embodiment of the present disclosure may include performing bidirectional inter prediction with respect to a current block (S3910), performing bidirectional weight prediction with respect to the current block (S3920), improving/correcting bidirectional motion information (S3930) and coding bidirectional inter prediction information (S3940).

Hereinafter, the steps of FIGS. 38 and 39 will be described in detail.

First, steps S3820 and S3910 of performing bidirectional inter prediction with respect to the current block will be described in detail.

In order to perform bidirectional inter prediction with respect to the current block, a reference picture list may be configured. The image encoding/decoding apparatus may configure N reference picture lists in units of at least one of picture, slice, tile, brick, CTU, CU or PU, and each reference picture list may be composed of M reference pictures. At this time, N and M may be positive integers. At this time, the reference picture may mean a pre-encoded/decoded picture.

In order to perform bidirectional inter prediction with respect to the current block, a plurality of pieces of motion information may be derived. For example, in performing bidirectional inter prediction with respect to the current block, two pieces of motion information may be used.

At this time, the motion information may include a motion vector (Vx, Vy), a reference picture list index and a reference picture index.

For example, single motion information may include a single reference picture list index.

As another example, a plurality of pieces of motion information may include one reference picture list index.

As another example, single motion information may refer to a single reference picture.

As another example, a plurality of pieces of motion information may refer to one reference picture.

The image coding apparatus may determine motion information or a prediction block for performing optimal bidirectional inter prediction. At this time, optimal cost may be derived using at least one method of RD-cost, SAD, SATD, MR-SAD or MR-SATD.

Bidirectional inter prediction of the current block may be performed based on at least one of a merge mode, an MMVD, an AMVP mode, a Symmetric MVD (SMVD), an affine merge mode, an affine AMVP mode, a SbTMVP (ATMVP) mode, a TPM, a GPM or a CIIP mode.

In the following description, a plurality of pieces of motion information predicted through bidirectional inter prediction may be expressed as first motion information to N-th motion information.

Next, steps S3830 and 3920 of performing bidirectional weight prediction with respect to the current block will be described in detail.

In performing bidirectional weight prediction with respect to the current block, bidirectional weight prediction and motion compensation may be performed.

Bidirectional weight prediction may mean a prediction method of performing derivation by a weighted sum of a plurality of prediction blocks generated using a plurality of pieces of motion information searched in a bidirectional inter prediction step.

At this time, when a weighted sum is applied to a plurality of prediction blocks, it is possible to increase encoding efficiency, by efficiently applying a change in brightness between pictures in bidirectional prediction.

In performing bidirectional weight prediction with respect to the current block, the final prediction block of the current block may be derived according to Equation 8 below.

$$P\_bi = w\_0 \times P\_0 + w\_1 \times P\_1 \qquad \text{Equation 8}$$

In Equation 8, P_0 may mean a first prediction block generated by first motion information and P_1 may mean a second prediction block generated by second motion information. P_bi may mean a prediction block or a motion compensation block generated by the sum of the weights of the plurality of prediction blocks. At this time, a sum of w_0 and w_1 may be 1.

For example, in performing bidirectional weight prediction with respect to the current block, a single weight may be used as shown in Equation 9 below.

$$P\_bi = ((K - w) \times P\_0 + w \times P\_1 + K/2) >> \log\_2 K \qquad \text{Equation 9}$$

where, K may be a value of 2N, and N may be a positive integer.

In performing bidirectional weight prediction with respect to the current block, a single weight set composed of a plurality of weights may be defined, and bidirectional weight prediction may be performed using at least one of the defined weights.

For example, a weight set of {3, 4, 5} or {4, 5, 3} may be defined and weight prediction may be performed using at least one of the defined weights.

As another example, a weight set of {−2, 3, 4, 5, 10} or {4, 5, 3, 10, −2} may be defined and weight prediction may be performed using at least one of the defined weights.

Meanwhile, in performing bidirectional weight prediction with respect to the current block, a plurality of different weight sets may be adaptively determined according to the encoding parameter of the current block.

For example, if the current block is a low-delay block, a weight set of {−2, 3, 4, 5, 10} or {4, 5, 3, 10, −2} may be used and, if the current block is not a low-delay block, a weight set of {3, 4, 5} or {4, 5, 3} may be used.

In addition, in performing bidirectional weight prediction with respect to the current block, a weight adaptively derived according to the encoding parameter of the current block may be used.

For example, if the prediction mode of the current block is a mode in which one weight is capable of being derived from a neighboring block, the derived weight may be determined as the weight of the current block.

As another example, if the prediction mode of the current block is a mode in which one weight is capable of being derived from a neighboring block, the equi-weight may be determined as the weight of the current block. For example, the equi-weight may be 4.

As another example, if the prediction mode of the current block is a mode in which a plurality of weights is capable of being derived from a neighboring block, a weight having a largest frequency among the derived weights may be determined as the weight of the current block.

As another example, if the prediction mode of the current block is a mode in which a plurality of weights is capable of being derived from a neighboring block, the equi-weight may be determined as the weight of the current block. For example, the equi-weight may be 4.

Here, the mode in which one weight is capable of being derived from the neighboring block may be at least one of a merge mode, an MMVD, an SbTMVP mode, a TPM, a GPM or a CIIP mode. In addition, the mode in which the plurality of weights is capable of being derived from the neighboring block may be an affine merge mode.

Meanwhile, the encoding parameter of the current block may include at least one of a prediction mode (merge mode, MMVD, SbTMVP mode, TPM, GPM, CIIP mode, affine merge mode, affine AMVP mode, SbTMVP), low delay, a block size (width, height, width*height) or cbf.

Here, low delay may mean that the encoding mode of the current block is a low-delay coding mode. In addition, low delay may mean that all the reference pictures in the reference picture list are in the past in display order based on the current picture in units of pictures, subpictures, slices, tile groups, tiles, CTUs or CUs. In addition, low delay may mean that all the reference pictures referenced by the motion information of the current block are in the past in display order based on the current picture.

In performing bidirectional weight prediction of the current block, a syntax element NoBackwardPredFlag may be defined. For example, NoBackwardPredFlag may be a syntax element indicating the low delay.

For example, NoBackwardPredFlag may be determined as a first value if the current block has low delay and may be determined as a second value if not. In the following description, the first value may be 1 and the second value may be 0, without being limited thereto.

As another example, NoBackwardPredFlag may be determined as a first value if a slice_type syntax transmitted in slice header NAL units indicates B slice and may be determined as a second value if not.

As another example, NoBackwardPredFlag may be determined as a first value if the POCs of all reference pictures in the list of all reference pictures of the current picture is less than the POC of the current picture and may be determined as a second value if not.

As another example, NoBackwardPredFlag may be determined as a first value if the POCs of all reference pictures indicated by the motion information of the current block are less than the POC of the current picture and may be determined as a second value if not.

As another example, NoBackwardPredFlag may be defined by a combination of the above-described examples. For example, NoBackwardPredFlag may be determined as a first value if a slice_type syntax transmitted in slice header NAL units indicates B slice and the POCs of all reference pictures in the list of all reference pictures of the current picture are less than the POC of the current picture, and may be determined as a second value if not.

Meanwhile, "1" may mean on and "0" may mean off. On the contrary, "0" may mean on and "1" may mean off.

Meanwhile, NoBackwardPredFlag may be transmitted in NAL units of at least one of SPS, PPS, Slice header or Slice data, and may be defined as transmitted binary information.

Meanwhile, in performing bidirectional weight prediction, NoBackwardPredFlag may not be defined.

In performing bidirectional weight prediction of the current block, determination and prediction of bidirectional weight may be adaptively performed according to NoBackwardPredFlag.

For example, if NoBackwardPredFlag has a first value, bidirectional weight prediction may be performed using at least one of the weights of {4, 5, 3}.

As another example, if NoBackwardPredFlag has a first value, bidirectional weight prediction may be performed using at least one of the weights of {4, 5, 3, 10, −2}.

As another example, if NoBackwardPredFlag has a first value, bidirectional weight prediction may be performed using at least one of the weights of {4, 10, −2}.

As another example, if NoBackwardPredFlag has a second value, bidirectional weight prediction may be performed using at least one of the weights of {4, 5, 3}.

As another example, if NoBackwardPredFlag has a second value, bidirectional weight prediction may be performed using at least one of the weights of {4, 5, 3, 10, −2}.

As another example, if NoBackwardPredFlag has a second value, bidirectional weight prediction may be performed using at least one of the weights of {4, 10, −2}.

As another example, if NoBackwardPredFlag has a first value, bidirectional weight prediction may be performed using at least one of the weights of {4, 5, 3, 10, −2}, and, if NoBackwardPredFlag has a second value, bidirectional weight prediction may be performed using at least one of the weights of {4, 5, 3}.

In performing bidirectional weight prediction, determination and prediction of the bidirectional weight may be performed regardless of NoBackwardPredFlag.

For example, regardless of NoBackwardPredFlag, bidirectional weight prediction may be performed using at least one of the weights {4, 5, 3}.

As another example, regardless of NoBackwardPredFlag, bidirectional weight prediction may be performed using at least one of the weights {4, 5, 3, 10, −2}.

As another example, regardless of NoBackwardPredFlag, bidirectional weight prediction may be performed using at least one of the weights {4, 10, −2}.

Next, steps S3840 and S3930 of improving/correcting the bidirectional motion information will be described in detail.

If bidirectional inter prediction is performed with respect to the current block, bidirectional motion information may be improved or corrected. In the following description, improvement and correction of motion information may be used as the same meaning.

In performing bidirectional motion improvement with respect to the current encoding block, motion information, to which motion improvement is applied, may be motion information derived from bidirectional inter prediction or motion information parsed in a bidirectional inter prediction information entropy decoding step.

In performing bidirectional motion improvement with respect to the current encoding block, bidirectional motion improvement may be adaptively performed.

For example, bidirectional motion improvement may be performed in a specific inter prediction mode.

For example, if a merge mode is applied to the current block, bidirectional motion improvement may be performed. In addition, for example, if an affine merge mode is applied to the current block, bidirectional motion improvement may be performed. In addition, for example, if an MMVD is applied to the current block, bidirectional motion improvement may be performed. In addition, for example, if a Symmetric MVD mode is applied, bidirectional motion improvement may be performed.

As another example, if a plurality of pieces of motion information refers to different reference picture lists, bidirectional motion improvement may be performed.

For example, if one of two pieces of motion information refers to a first reference picture list L0 and the other motion information refers to a second reference picture list L1, bidirectional motion improvement may be performed.

As another example, bidirectional motion improvement may be performed according to the reference picture of the motion information.

For example, when one of two reference pictures is a reference picture before the current reference picture in display order and the other is a reference picture after the current picture, bidirectional motion improvement may be performed. In addition, for example, when distances (POC difference) between a plurality of reference pictures and the current picture are the same, bidirectional motion improvement may be performed.

As another example, bidirectional motion improvement may be performed according to the size of the current block.

For example, if the number of samples of the current block is N or more, bidirectional motion improvement may be performed. At this time, N may be one of 16, 32, 64, 128, 256 or 512. In addition, for example, when the height or width of the current block is N or greater, bidirectional motion improvement may be performed. At this time, N may be at least one of 4, 8, 16, 32 or 64.

As another example, bidirectional motion improvement may be performed according to the weight determined in bidirectional motion compensation.

For example, when a plurality of weights for prediction are the same, bidirectional motion improvement may be performed. In addition, for example, when a plurality of weights for prediction are different from each other, bidirectional motion improvement may be performed. In addition, for example, when there is no weight for prediction, bidirectional motion improvement may be performed.

As another example, when one or more of the above-described conditions are satisfied, bidirectional motion improvement may be performed.

For example, when the current block satisfies all the above-described conditions, bidirectional motion improvement may be performed.

In performing bidirectional motion improvement with respect to the current coding block, when motion compensation is performed, interpolation of the current block may be performed using at least one of a DCT 8-tap filter, a DCT 4-tap filter, a Cubic filter or a Bi-linear filter.

In performing bidirectional motion improvement with respect to the current coding block, a motion improvement range may be set. At this time, the motion improvement range may mean a certain range centered on a start point. The start point may be a reference pixel indicated by motion information to be improved (before correction).

Figures 42, 43:
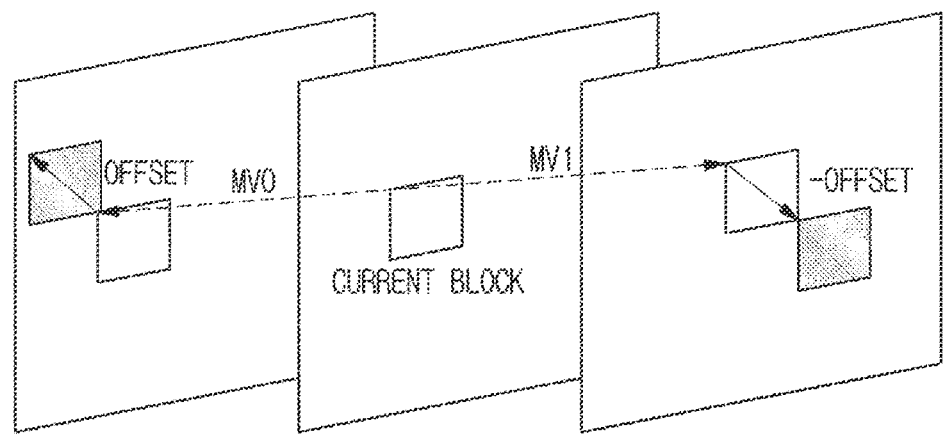
FIG. 42 is a view illustrating a motion improvement range according to an embodiment of the present disclosure.
FIGS. 43 and 44 are views illustrating a motion improvement offset according to several embodiments of the present disclosure.

FIG. 42 is a view illustrating a motion improvement range according to an embodiment of the present disclosure.

Here, the improvement range may be defined as a vertical axis range (−N to N) or a horizontal axis range (−M to M). N and M may be positive integers. For example, N and M may be one of 1, 2, 3, 4, 5 . . . .

For example, as shown in FIG. 42, the improvement range may be determined as a vertical axis (−2 to 2) or horizontal axis (−2 to 2) range.

The defined motion improvement range may mean a minimum value and maximum value of a motion offset, and the motion offset may be a difference between a start point and an improved motion vector. The improved motion vector may be defined as one of Equation 10 or Equation 11 below.

$$MV\_refined = MV\_original + MV\_offset \qquad \text{Equation 10}$$

$$MV\_refined = MV\_original - MV\_offset \qquad \text{Equation 11}$$

where, the start point may be a pixel indicated by MV_original. At this time, if the motion offset exceeds the motion improvement range, the offset value may be clipped into the motion improvement range.

In performing bidirectional motion improvement with respect to the current coding block, integer pixel unit motion improvement may be performed. If integer pixel unit motion improvement is performed, a motion offset may be determined as an integer or the improved motion vector may be determined in integer units.

Integer pixel unit motion improvement may be performed in the defined motion improvement range.

If integer pixel unit motion improvement is performed, an offset having lowest cost between prediction blocks derived from improved motion information may be determined as a motion offset for motion improvement of a current block. At this time, cost between prediction blocks may be calculated using at least one of RD-cost, SAD, SATD, MR-SAD or MR-SATD.

Here, the cost may mean an error or weight error of two prediction blocks.

Figures 44, 45:
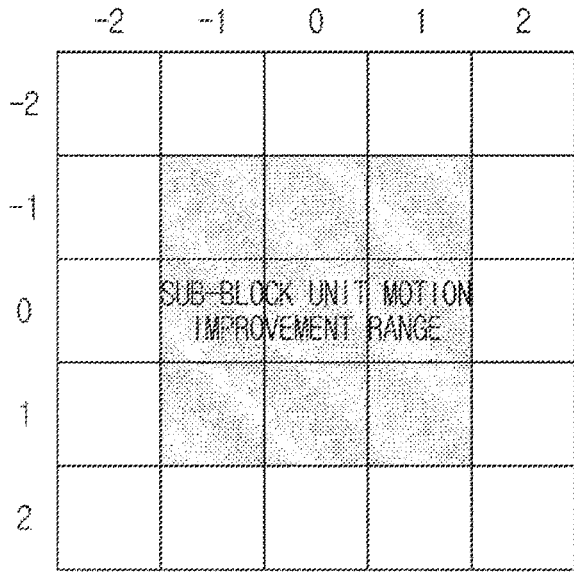
FIG. 45 is a view illustrating a motion improvement method according to an embodiment of the present disclosure.

FIGS. 43 and 44 are views illustrating a motion improvement offset according to several embodiments of the present disclosure.

If integer pixel unit motion improvement is performed, a plurality of offsets may be determined.

For example, in performing bidirectional motion improvement with respect to two pieces of motion information, a motion offset for motion information may be determined.

FIG. 43 shows a situation in which a plurality of offsets is determined in performing motion improvement of a current block.

If integer pixel unit motion improvement is performed, a singular offset may be determined.

For example, in performing bidirectional motion improvement with respect to two pieces of motion information, motion offset for each motion information may be the same. For example, a plus (+) offset may be performed with respect to one piece of motion information and a minus (−) offset may be determined with respect to the other motion information. At this time, the absolute values of the plus offset and the minus offset may be the same.

Meanwhile, two reference pictures may be a past picture and a future picture based on a current picture. Alternatively, if two reference pictures may be a past picture and a future picture based on a current picture, encoding efficiency of motion improvement may increase.

FIG. 44 shows a situation in which a single offset is determined in performing motion improvement of a current block.

Meanwhile, in performing integer pixel unit motion improvement, sequential search (full search) of all possible offsets may be performed.

In performing bidirectional motion improvement with respect to the current block, sub-pixel unit motion improvement may be performed. Here, sub-pixel unit motion improvement may mean motion improvement motion improvement in which a motion offset is in a sub-pixel unit.

In performing sub-pixel unit motion improvement, operation-based sub-pixel unit improvement may be performed.

At this time, sub-pixel unit improvement on the horizontal axis may be performed according to Equation 12 below.

$$x_0 = \frac{E(-1, 0) - E(1, 0)}{2(E(-1, 0) + E(1, 0) - 2E(0, 0))} \qquad \text{Equation 12}$$

Meanwhile, sub-pixel unit improvement on the vertical axis may be performed according to Equation 13 below.

$$y_0 = \frac{E(0, -1) - E(0, 1)}{2(E(0, -1) + E(0, 1) - 2E(0, 0))} \qquad \text{Equation 13}$$

In Equation 12 and Equation 13, E may be cost obtained in the above-described integer pixel unit improvement.

FIG. 45 is a view illustrating a motion improvement method according to an embodiment of the present disclosure.

FIG. 45 shows cost according to the location required for sub-pixel unit improvement when an integer pixel unit offset is (1, −1).

Sub-pixel unit improvement may be performed only when all cost at the neighboring location of the integer pixel unit offset required for sub-pixel unit improvement is present.

For example, in performing sub-pixel unit improvement on the horizontal axis, if cost of at least one of $E(-1,0)$ or $E(1,0)$ is not present, sub-pixel unit improvement on the horizontal axis may not be performed.

As another example, in performing sub-pixel unit improvement on the vertical axis, if cost of at least one of $E(0,-1)$ or $E(0,1)$ is not present, sub-pixel unit improvement on the vertical axis may not be performed.

As another example, in performing sub-pixel unit improvement, if cost of at least one of $E(-1,0)$, $E(1,0)$, $E(0,-1)$ or $E(0,1)$ is not present, sub-pixel unit improvement may not be performed.

Figure 46:
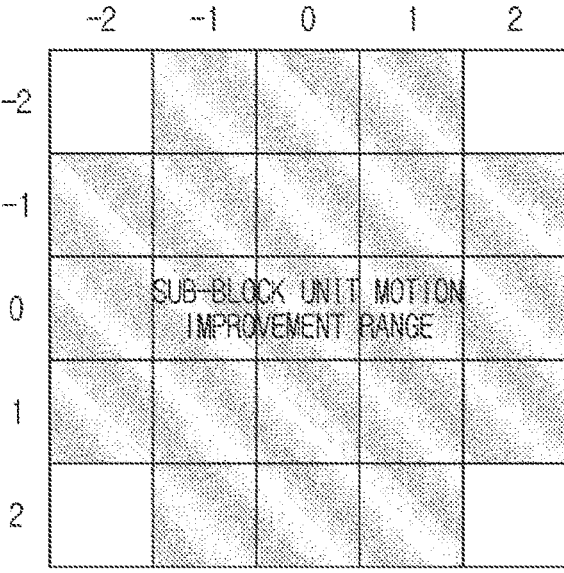
FIG. 46 is another view illustrating a motion improvement method according to an embodiment of the present disclosure.

FIG. 46 is another view illustrating a motion improvement method according to an embodiment of the present disclosure.

FIG. 46 shows an example of an integer pixel unit offset capable of sub-pixel unit improvement in the motion improvement range of a vertical axis (−2 to 2) and a horizontal axis (−2 to 2).

In performing operation-based sub-pixel unit improvement, if cost required for sub-pixel unit improvement is not present, alternative cost may be derived using cost available in the vicinity.

For example, if $E(-1,0)$ is not present, $E(-1,0)$ may be derived according to Equation 14 below.

$$E(-1, 0) = w\_0 * E(0, -1) + w\_1 * E(0, 0) + w\_2 * E(0, 1) \qquad \text{Equation 14}$$

As another example, if $E(1,0)$ is not present, $E(1,0)$ may be derived according to Equation 15 below.

$$E(1, 0) = w\_0 * E(0, -1) + w\_1 * E(0, 0) + w\_2 * E(0, 1) \qquad \text{Equation 15}$$

As another example, if $E(0,-1)$ is not present, $E(0,-1)$ may be derived according to Equation 16 below.

$$E(0, -1) = w\_0 * E(-1, 0) + w\_1 * E(0, 0) + w\_2 * E(1, 0) \qquad \text{Equation 16}$$

As another example, if E(0,1) is not present, E(0,1) may be derived according to Equation 17 below.

$$E(0, 1) = w\_0 * E(-1, 0) + w\_1 * E(0, 0) + w\_2 * E(1, 0) \quad \text{Equation 17}$$

In Equation 14 to Equation 17, a sum of w0, w1 and w2 may be 1 and each of w0, w1 and w2 may be a positive or negative real number.

For example, w0, w1, w2 may be one of {0.25, 0.5, 0.25}, {0, 0.75, 0.25} and {0.25, 0.75, 0}.

In performing sub-pixel unit motion improvement, search-unit sub-pixel unit improvement may be performed.

At this time, a sub-pixel unit offset is applicable to an integer unit motion improvement offset.

At this time, a plurality of specific sub-pixel unit offsets is applicable, and the sub-pixel unit offset may be one of {±1/16, ±2/16, ±3/16, ±4/16, ±5/16, ±6/16, ±7/16, ±8/16}.

If sub-pixel unit motion improvement is performed, an offset having lowest cost between prediction blocks derived from improved motion information may be determined as a motion offset for motion improvement of the current block. At this time, cost between the prediction blocks may be calculated at least one of RD-cost, SAD, SATD, MR-SAD or MR-SATD.

Here, the cost may mean an error or weight error of two prediction blocks.

Next, steps S3940 and S3810 of encoding/decoding bidirectional inter prediction information of the current block will be described in detail.

In bidirectional inter prediction of the current block, bidirectional inter prediction information may be entropy-encoded/decoded.

In encoding/decoding bidirectional inter prediction information, bidirectional weight prediction information may be entropy-encoded/decoded.

When bidirectional weight prediction information is encoded/decoded, a bidirectional weight prediction information performing flag may be defined. For example, the bidirectional weight prediction information performing flag may be defined as a syntax element bcw_enable_flag or sps_bcw_enabled_flag. The bidirectional weight prediction information performing flag may be flag information indicating whether to apply bidirectional weight prediction of the current block.

For example, signaling and entropy-coding/decoding of the bidirectional weight prediction information performing flag may be performed in units of at least one of SPS, PPS or Slice header.

Meanwhile, if the bidirectional weight prediction information performing flag has a first value, bidirectional weight prediction may be performed, and, if the bidirectional weight prediction information performing flag has a second value, the equi-weight is applicable to bidirectional prediction.

When encoding/decoding of bidirectional weight prediction information is performed, a bidirectional weight index may be defined. For example, the bidirectional weight index may be defined as a syntax element bcw_idx. The bidirectional weight index may be index information indicating a weight applied to the current block.

For example, signaling and entropy encoding/decoding of the bidirectional weight index may be performed in units of at least one of picture, subpicture, slice, tile group, tile, brick, CTU, CU, PU or TU.

Meanwhile, binarization of the bidirectional weight index may be performed using a method of at least one of truncated Unary code, k-th exponential Golomb code, fixed-length code.

For example, the weight indices of the weights of {3, 4, 5} may be signaled and entropy-coded/decoded based on a binary table of Table 3 below.

TABLE 3

| Weight index | Weight | Binary bit |
|---|---|---|
| 0 | 4 | 0 (1) |
| 1 | 5 (3) | 10 (01) |
| 2 | 3 (5) | 11 (00) |

As another example, the weight indices of the weights of {−2, 3, 4, 5, 10} may be signaled and entropy-coded/decoded based on binary tables of Tables 4 and 5 below.

TABLE 4

| Weight index | Weight | Binary bit |
|---|---|---|
| 0 | 4 | 0 (1) |
| 1 | 5 (3) | 10 (01) |
| 2 | 3 (5) | 110 (001) |
| 3 | 10 (−2) | 1110 (0001) |
| 4 | −2 (10) | 1111 (0000) |

TABLE 5

| Weight index | Weight | Binary bit |
|---|---|---|
| 0 | 4 | 0 (1) |
| 1 | 5 (3) | 100 (000) |
| 2 | 3 (5) | 101 (001) |
| 3 | 10 (−2) | 110 (010) |
| 4 | −2 (10) | 111 (011) |

When encoding/decoding of bidirectional weight prediction information is performed, a bidirectional equi-weight flag and/or a bidirectional asymmetric sign weight flag may be defined. For example, the bidirectional equi-weight flag may be defined as a syntax element bcw_equiweight_flag, and the bidirectional asymmetric sign flag may be defined as a syntax element bcw_asymmetric_sign_flag.

For example, signaling and entropy-coding/decoding of the bidirectional equi-weight flag and/or the bidirectional asymmetric sign weight flag may be performed in units of at least one of picture, subpicture, slice, tile group, tile, brick, CTU, CU, PU or TU.

Meanwhile, binarization of the bidirectional equi-weight flag and/or the bidirectional asymmetric sign weight flag may be performed using a method of at least one of a truncated Unary code, a k-th exponential Golomb code or a fixed-length code.

The bidirectional equi-weight flag may be flag information indicating whether the weights of the prediction blocks are the same and the bidirectional asymmetric sign weight flag may be flag information indicating the signs of the weight of the prediction blocks are different from each other.

For example, the bidirectional equi-weight weight flag, the bidirectional asymmetric sign weight flag and the bidirectional weight index of weights of {−2, 3, 4, 5, 10} may be signaled and entropy-coded/decoded based on value assignment of Table 6.

TABLE 6

| Weight | Bidirectional equi-weight flag | Bidirectional asymmetric weight flag | Bidirectional weight index |
|---|---|---|---|
| 4 | 1 | | |
| 5 | 0 | 0 | 0 (1) |
| 3 | 0 | 0 | 1 (0) |
| 10 | 0 | 1 | 0 (1) |
| −2 | 0 | 1 | 1 (0) |

In performing entropy encoding/decoding of bidirectional weight prediction information with respect to the current block, a syntax element NoBackwardPredFlag may be performed.

At this time, entropy encoding/decoding of bidirectional weight prediction information may be performed in NAL units of at least one of SPS, PPS, Slice header or Slice data.

For example, NoBackwardPredFlag may be determined as a first value if the current block has low delay and may be determined as a second value if not. In the following description, the first value may be 1 and the second value may be 0.

As another example, NoBackwardPredFlag may be determined as a first value if a slice_type syntax transmitted in slice header NAL units indicates B slice and may be determined as a second value if not.

As another example, NoBackwardPredFlag may be determined as a first value if the POCs of all reference pictures in the list of all reference pictures of the current picture are less than the POC of the current picture and may be determined as a second value if not.

As another example, NoBackwardPredFlag may be determined as a first value if the POCs of all reference pictures indicated by the motion information of the current block are less than the POC of the current picture and may be determined as a second value if not.

At this time, NoBackwardPredFlag may be defined as a combination of the above-described examples. For example, NoBackwardPredFlag may be determined as a first value if a slice_type syntax transmitted in slice header NAL units indicates B slice and the POCs of all reference pictures in the list of all reference pictures of the current picture are less than the POC of the current picture, and may be determined as a second value if not.

Meanwhile, "1" may mean on and "0" may mean off. On the contrary, "0" may mean on and "1" may mean off.

Meanwhile, NoBackwardPredFlag may be transmitted in NAL units of at least one of SPS, PPS, Slice header or Slice data, and may be defined as transmitted binary information.

Meanwhile, in performing bidirectional weight prediction, NoBackwardPredFlag may not be defined. For example, if NoBackwardPredFlag is not defined, upper NAL unit information may not be used.

If bidirectional weight prediction information of the current block is entropy-encoded/decoded, entropy-encoding/decoding of bidirectional weight prediction information may be adaptively performed according to NoBackwardPredFlag.

For example, if NoBackwardPredFlag has a first value, binarization of a truncated Unary code having a specific Cmax value may be performed with respect to bcw_idx. At this time, Cmax may have a value of at least one of {1, 2, 3, 4, 5}.

As another example, if NoBackwardPredFlag has a second value, binarization of a truncated Unary code having a specific Cmax value may be performed with respect to bcw_idx. Here, Cmax may have a value of at least one of {1, 2, 3, 4, 5}.

As another example, if NoBackwardPredFlag has a first value, bcw_idx may be binarized with a truncated Unary code having a Cmax value of 4. In contrast, if NoBackwardPredFlag has a second value, bcw_idx may be binarized with a TU code having a Cmax value of 2.

If bidirectional weight prediction information of the current block is entropy-encoded/decoded, bidirectional weight search and prediction may be performed regardless of NoBackwardPredFlag.

At this time, NoBackwardPredFlag may not be signaled in NAL units of at least one of SPS, PPS, Slice header or, Slice data. If NoBackwardPredFlag is not signaled, parsing dependence between NAL units may be removed.

For example, regardless of NoBackwardPredFlag, bcw_idx which may indicate weights of {4, 5, 3} or {4, 3, 5} may be binarized with a truncated Unary code having a Cmax value of 2.

As another example, regardless of NoBackwardPredFlag, bcw_idx which may indicate weights of {4, 5, 3, 10,−2} or {4, 3, 5,−2, 10} may be binarized with a truncated Unary code having a Cmax value of 4.

As another example, regardless of NoBackwardPredFlag, bcw_idx which may indicate weights of {4, 10,−2} or {4,−2, 10} may be binarized with a truncated Unary code having a Cmax value of 2.

As another example, regardless of NoBackwardPredFlag, bcw_idx which may indicate weights of {4, 10,−2, 5, 3} or {4,−2, 10, 3, 5} may be binarized with a truncated Unary code having a Cmax value of 4.

Meanwhile, the weight may be changed according to definition or setting of the weight, the ratio value that the weight actually means may be the same as the above example. In addition, the weight may be changed according to definition or setting of the weight, but the order according to the size of the weight may be the same.

If bidirectional weight prediction information of the current block is entropy-coded/decoded, at least one of normal mode entropy coding or bypass mode entropy coding may be applied to each binary bit.

Normal mode entropy coding may mean CABAC coding and bypass mode entropy coding may mean bypass coding.

For example, normal mode entropy coding may be performed with respect to a bidirectional equi-weight flag.

As another example, normal mode entropy coding may be performed with respect to bidirectional asymmetric sign weight flag.

As another example, bypass mode entropy coding may be performed with respect to a bidirectional weight index.

As another example, normal mode entropy coding may be performed with respect to a first binary bit of the bidirectional weight index and bypass mode entropy coding may be performed with respect to the other binary bit. For example, entropy encoding/decoding of bcw_idx may be performed according to Table 7 or 8 below.

TABLE 7

| Syntax element | binIdx | | | | | |
|---|---|---|---|---|---|---|
| | 0 | 1 | 2 | 3 | 4 | >=5 |
| bcw_idx[ ][ ] | 0 | bypass | bypass | bypass | na | na |

TABLE 8

| | | binIdx | | | |
|---|---|---|---|---|---|
| Syntax element | 0 | 1 | 2 | 3 | 4 | >=5 |
| bcw_idx[ ][ ] | 0 | bypass | na | na | na | na |

As another example, normal mode entropy coding may be performed with respect to first and second binary bits of the bidirectional weight index, and bypass mode entropy coding may be performed with respect to the other binary bit. For example, entropy encoding/decoding of bcw_idx may be performed according to Table 9 below.

TABLE 9

| | | binIdx | | | |
|---|---|---|---|---|---|
| Syntax element | 0 | 1 | 2 | 3 | 4 | >=5 |
| bcw_idx[ ][ ] | 0 | 1 | bypass | na | na | na |

As another example, an entropy encoding/decoding method of bcw_idx may be adaptively determined according to NoBackwardPredFlag. For example, entropy encoding/decoding of bcw_idx may be performed according to Table 10 below.

TABLE 10

| | | binIdx | | | |
|---|---|---|---|---|---|
| Syntax element | 0 | 1 | 2 | 3 | 4 | >=5 |
| bcw_idx[ ][ ] NoBackwardPredFlag == 0 | 0 | bypass | na | na | na | na |
| bcw_idx[ ][ ] NoBackwardPredFlag == 1 | 0 | bypass | bypass | bypass | na | na |

As another example, if normal code entropy coding is applied to bcw_idx, a context model may be adaptively selected according to NoBackwardPredFlag. For example, entropy encoding/decoding of bcw_idx may be performed according to Table 11 below.

TABLE 11

| | | binIdx | | | |
|---|---|---|---|---|---|
| Syntax element | | 0 | 1 | 2 | 3 | 4 | >=5 |
| bcw_idx[ ][ ] | NoBackwardPredFlag == 0 ? 0:1 | bypass | na | na | na | na |

At this time, the numbers shown in Tables 7 to 11 may indicate that normal mode entropy coding is performed with respect to the current block and a context model used for normal mode entropy coding.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

At least one of the syntax elements (flags, indices, etc.) entropy-coded in the encoder and entropy-decoded in the decoder may use at least one of the following binarization, debinarization, entropy encoding/decoding methods.

Method of binarization/debinarization of 0-th order Exp_Golomb having a sign (sek(v))

Method of binarization/debinarization of k-th order Exp_Golomb having a sign (sek(v))

Method of binarization/debinarization of 0-th order Exp_Golomb of a positive integer without a sign (ue (v))

Method of binarization/debinarization of k-th order Exp_Golomb of a positive integer without a sign (uek (v))

Fixed-length binarization/debinarization method (f(n))

Truncated Rice binarization/debinarization method or Truncated Unary binarization/debinarization method (tu(v))

Truncated Binary binarization/debinarization method (tb (v))

Context adaptive arithmetic encoding/decoding method (ae(v))

Byte-unit bit string (b(8))

Binarization/debinarization method of an integer having a sign (i(n))

Binarization/debinarization method of a positive integer without a sign (u(n))

Unary binarization/debinarization method

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A video decoding method, comprising:
generating a prediction block for a current block by performing prediction on the current block; and
generating a reconstructed block using the prediction block, wherein
a distance from a center of the current block and an angle are used in generating the prediction block,
decoding for a partitioning index is performed,
the partitioning index indicates the distance and the angle, and
a diagonal boundary line between two regions of the prediction block is determined based on the distance and the angle.

2. The video decoding method of claim 1, wherein motion information of a list for the current block is used in generating the prediction block.

3. The video decoding method of claim 1, wherein a weight applied for a sample of the current block is determined based on the distance and the angle.

4. The video decoding method of claim 3, wherein a predefined set of weights is used in applying the weight.

5. The video decoding method of claim 3, wherein weights are derived for samples of the current blocks, respectively.

6. The video decoding method of claim 3, wherein a weight for chrominance sample of a chrominance component of the current block is the same as a weight of a luminance sample of a luminance component of the current block of which a position corresponds to a position of the chrominance sample.

7. The video decoding method of claim 1, wherein the current block is partitioned into a plurality of regions, and
a plurality of motion information are stored for the plurality of regions, respectively.

8. The video decoding method of claim 7, wherein a plurality of prediction blocks are generated using the plurality of motion information, and
a weight for the plurality of prediction blocks.

9. The video decoding method of claim 8, wherein a prediction block to which the weight is applied among the plurality of prediction blocks has a pentagonal shape.

10. The video decoding method of claim 1, wherein the prediction is a combination of intra prediction and inter prediction.

11. The video decoding method of claim 10, wherein a specific intra prediction mode is fixedly used for the intra prediction.

12. The video decoding method of claim 10, wherein the prediction is applied in a case that a size of the current block is greater than or equal to 8×8.

13. A video encoding method, comprising:
generating a prediction block for a current block by performing prediction on the current block; and
generating a reconstructed block using the prediction block, wherein a distance from a center of the current block and an angle are used in generating the prediction block, encoding for a partitioning index is performed, the partitioning index indicates the distance and the angle, and a diagonal boundary line between two regions of the prediction block is determined based on the distance and the angle.

14. The video encoding method of claim 13, wherein motion information of a list for the current block is used in generating the prediction block.

15. The video encoding method of claim 13, wherein the prediction is a combination of intra prediction and inter prediction.

16. A non-transitory computer-readable recording medium storing a bitstream generated by the video encoding method of claim 13.

17. A non-transitory computer-readable recording medium storing a bitstream, the bitstream comprising:

a partitioning index, wherein the partitioning index is information used to perform prediction to generate a prediction block for a current block a distance from a center of the current block and an angle are used in generating the prediction block, the partitioning index indicates the distance and the angle, and a diagonal boundary line between two regions of the prediction block is determined based on the distance and the angle.

18. A method for sending a bitstream, the method comprising:

sending the bitstream comprising a partitioning index, wherein the partitioning index is information used to perform prediction to generate a prediction block for a current block, a distance from a center of the current block and an angle are used in generating the prediction block, the partitioning index indicates the distance and the angle, and a diagonal boundary line between two regions of the prediction block is determined based on the distance and the angle.

\* \* \* \* \*